United States Patent [19]
Wang

[11] Patent Number: 6,118,817
[45] Date of Patent: *Sep. 12, 2000

[54] DIGITAL VIDEO SIGNAL ENCODER AND ENCODING METHOD HAVING ADJUSTABLE QUANTIZATION

[75] Inventor: Albert S. Wang, Palo Alto, Calif.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/819,507

[22] Filed: Mar. 14, 1997

[51] Int. Cl.⁷ ..................................................... H04N 7/12
[52] U.S. Cl. ........................... 375/240; 348/405; 348/419
[58] Field of Search .................................... 348/407, 405, 348/409, 411, 412, 415, 439, 384, 390, 400, 401, 402, 416, 419; 382/232, 236, 238, 251; 375/240; H04N 7/12

[56] References Cited

U.S. PATENT DOCUMENTS

| | | | |
|---|---|---|---|
| 4,816,914 | 3/1989 | Ericsson | 358/133 |
| 5,050,161 | 9/1991 | Golestani | 370/60 |
| 5,144,425 | 9/1992 | Joseph | 358/133 |
| 5,313,454 | 5/1994 | Bustini et al. | 370/13 |
| 5,351,095 | 9/1994 | Kerdranvat | 348/699 |
| 5,414,469 | 5/1995 | Gonzales et al. | 348/408 |
| 5,434,848 | 7/1995 | Chimento, Jr. et al. | 370/17 |
| 5,453,801 | 9/1995 | Kim | 348/699 |
| 5,473,379 | 12/1995 | Horne | 348/416 |
| 5,490,252 | 2/1996 | Macera et al. | 395/200.1 |
| 5,502,492 | 3/1996 | Jung | 348/413 |
| 5,504,744 | 4/1996 | Adams et al. | 370/60.1 |
| 5,512,952 | 4/1996 | Iwamura | 348/416 |
| 5,519,701 | 5/1996 | Colmant et al. | 370/60.1 |
| 5,537,155 | 7/1996 | O'Connell et al. | 348/699 |
| 5,557,341 | 9/1996 | Weiss et al. | 348/699 |
| 5,566,175 | 10/1996 | Davis | 370/84 |
| 5,574,724 | 11/1996 | Bales et al. | 370/68.1 |
| 5,576,767 | 11/1996 | Lee et al. | 348/413 |
| 5,623,312 | 4/1997 | Yan et al. | 348/416 |
| 5,623,313 | 4/1997 | Naveen | 348/416 |
| 5,978,544 | 11/1999 | Shimada et al. | 348/405 |

OTHER PUBLICATIONS

"Video Coding for Low Bitrate Communication", ITU–T, Draft H.263: Line Transmission of Non–Telephone Signals, Int'l Telecommunication Union, (May 2, 1996).

(List continued on next page.)

*Primary Examiner*—Young Lee
*Attorney, Agent, or Firm*—Schwegman, Lundberg, Woessner & Kluth, P.A.

[57] ABSTRACT

A motion video signal encoder maximizes image quality without exceeding transmission bandwidth available to carry the encoded motion video signal by comparing encoded frames of the motion video signal to a desired size of frame. If the size of encoded frames differ from the desired size, quantization is adjusted to produce encoded frames closer in size to the desired size. In addition, a cumulative bandwidth balance records an accumulated amount of available bandwidth. The cumulative bandwidth balance is adjusted as time elapses to add to the available bandwidth and as each frame is encoded to thereby consume bandwidth. If the cumulative bandwidth balance deviates from a predetermined range, quantization is adjusted as needed to either improve image quality to more completely consume available bandwidth or to reduce image quality to thereby consume less bandwidth. Rapid changes in the amount of change or motion in the motion video signal are detected by comparing the amount of change between two consecutive frames and the amount of change between the next two consecutive frames. Quantization is precompensated according to the measured rapid change. Conditional replenishment is improved by dividing macroblocks into quadrants and measuring differences between corresponding quadrants of macroblocks. As a result, sensitivity to changes along edges and corners of macroblocks is increased. In addition, sensitivity to changes in a particular macroblock is increased when an adjacent macroblock contains sufficient change to be encoded and therefore not a candidate for conditional replenishment.

9 Claims, 13 Drawing Sheets

OTHER PUBLICATIONS

Chaddha, N., et al., "An end to end software only scalable video delivery system", *Proceedings Networks and Operating System Support for Digital Audio and Video*, pp. 130–141, (Apr. 21, 1995).

Chaddha, N., et al., "Hierarchical Vector Quantization of Perceptually Weighted Block Transforms", *IEEE*, pp. 3–12, (1995).

Linde, Y., et al., "An Algorithm for Vector Quantization Design", *IEEE Transactions on Communications*, vol. COM–28, No. 1, 84–95, (Jan. 1980).

DIGITAL VIDEO SIGNAL ENCODER AND ENCODING METHOD HAVING ADJUSTABLE QUANTIZATION

CROSS REFERENCE TO RELATED APPLICATIONS

This application is related to co-pending U.S. application Ser. No. 08/818,805, filed on Mar. 14, 1997, entitled "Method and Apparatus for Implementing Motion Detection in Video Compression," U.S. application Ser. No. 08/819,507, filed Mar. 14, 1997, entitled "Digital Video Signal Encoder and Encoding Method," U.S. application Ser. No. 08/818,804, filed on Mar. 14, 1997, entitled "Production of a Video Stream with Synchronized Annotations over a Computer Network," U.S. application Ser. No. 08/819,586, filed on Mar. 14, 1997, entitled "Method and Apparatus for Implementing Control Functions in a Streamed Video Display System," U.S. application Ser. No. 08/818,769, filed on Mar. 14, 1997, entitled "Method and Apparatus for Automatically Detecting Protocols in a Computer Network," U.S. application Ser. No. 08/818,127, filed on Mar. 14, 1997, entitled "Dynamic Bandwidth Selection for Efficient Transmission of Multimedia Streams in a Computer Network," U.S. application Ser. No. 08/819,585, filed on Mar. 14, 1997, entitled "Streaming and Display of a Video Stream with Synchronized Annotations over a Computer Network," U.S. application Ser. No. 08/818,664, filed on Mar. 14, 1997, entitled "Selective Retransmission for Efficient and Reliable Streaming of Multimedia Packets in a Computer Network," U.S application Ser. No. 08/819,579, filed Mar. 14, 1997, entitled "Method and Apparatus for Table-Based Compression with Embedded Coding," U.S. application Ser. No. 08/818,826, filed on Mar. 14, 1997, entitled "Digital Video Signal Encoder and Encoding Method," all filed concurrently herewith, U.S. application Ser. No. 08/822,156, filed on Mar. 17, 1997, entitled "Method and Apparatus for Communication Media Commands and Data Using the HTTP Protocol," provisional U.S. application Ser. No 60/036, 662, filed on Jan. 30, 1997, entitled "Methods and Apparatus for Autodetecting Protocols in a Computer Network," U.S. application Ser. No. 08/625,650, filed on Mar. 29, 1996, entitled "Table-Based Low-Level Image Classification System," U.S. application Ser. No. 08/714,447, filed on Sep. 16, 1996, entitled "Multimedia Compression System with Additive Temporal Layers," and is a continuation-in-part of U.S. application Ser. No. 08/623,299, filed on march 28, 1996, entitled "Table-Based Compression with Embedded Coding," which are all incorporated by reference in their entirety for all purposes.

FIELD OF THE INVENTION

The present invention relates to digital video signal compression and, in particular, to a particularly efficient signal encoding mechanism for encoding digital video signals according to digital video standards such as the ITU standard H.263.

BACKGROUND OF THE INVENTION

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

In general, greater degrees of compression are achieved at the expense of video image signal loss and higher quality motion video signals are achieved at the expense of lesser degrees of compression and thus at the expense of greater bandwidth requirements. It is particularly difficult to balance image quality with available bandwidth when delivery bandwidth is limited. Such is the case in real-time motion video signal delivery such as video telephone applications and motion video on demand delivery systems. It is generally desirable to maximize the quality of the motion video signal as encoded without exceeding the available bandwidth of the transmission medium carrying the encoded motion video signal. If the available bandwidth is exceeded, some or all of the sequence of video images are lost and, therefore, so is the integrity of the motion video signal. If an encoded motion video signal errs on the side of conserving transmission medium bandwidth, the quality of the motion video image can be compromised significantly.

The format of H.263 encoded digital video signals is known and is described more completely in "ITU-T H.263: Line Transmission of Non-Telephone Signals, Video Coding for Low Bitrate Communication" (hereinafter "ITU-T Recommendation H.263"). Briefly, a digital motion video image, which is sometimes called a video stream, is organized hierarchically into groups of pictures which includes one or more frames, each of which represents a single image of a sequence of images of the video stream. Each frame includes a number of macroblocks which define respective portions of the video image of the frame. An I-frame is encoded independently of all other frames and therefore represents an image of the sequence of images of the video stream without reference to other frames. P-frames are motion-compensated frames and are therefore encoded in a manner which is dependent upon other frames. Specifically, a P-frame is a predictively motion-compensated frame and depends only upon one I-frame or, alternatively, another P-frame which precedes the P-frame in the sequence of frames of the video image. The H.263 standard also describes BP-frames; however, for the purposes of description herein, a BP-frame is treated as a P-frame.

All frames are compressed by reducing redundancy of image data within a single frame. Motion-compensated frames are further compressed by reducing redundancy of image data within a sequence of frames. Since a motion video signal includes a sequence of images which differ from one another only incrementally, significant compression can be realized by encoding a number of frames as motion-compensated frames, i.e., as P-frames. However, errors from noise introduced into the motion video signal or artifacts from encoding of the motion video signal can be perpetuated from one P-frame to the next and therefore persist as a rather annoying artifact of the rendered motion video image. It is therefore desirable to periodically send an I-frame to eliminate any such errors or artifacts. Conversely, I-frames require many times more bandwidth, e.g., on the order of ten times more bandwidth, than P-frames, so encoding 1-frames too frequently consumes more bandwidth than necessary. Accordingly, determining when to include an I-frame, rather than a P-frame, in an encoded video stream is an important consideration when maximizing video image quality without exceeding available bandwidth.

Another important consideration when maximizing video image quality within limited signal bandwidth is a quantization parameter Q. In encoding a video signal according to a compression standard such as H.263, a quantization parameter Q is selected as a representation of the compromise between image detail and the degree of compression achieved. In general, a greater degree of compression is achieved by sacrificing image detail, and image detail is enhanced by sacrificing the degree of achievable compression of the video signal.

However, a particular quantization parameter Q which is appropriate for one motion video signal can be entirely inappropriate for a different motion video signal. For example, motion video signals representing a video image which changes only slightly over time, such as a news broadcast (generally referred to as "talking heads"), can be represented by relatively small P-frames since successive frames differ relatively little. As a result, each frame can include greater detail at the expense of less compression of each frame. Conversely, motion video signals representing a video image which changes significantly over time, such as fast motion sporting events, require larger P-frames since successive frames differ considerably. Accordingly, each frame requires greater compression at the expense of image detail.

Determining an optimum quantization parameter Q for a particular motion video signal can be particularly difficult. Such is especially true for some motion video signals which include both periods of little motion and periods of significant motion. For example, in a motion video signal representing a football game includes periods where both teams are stationary awaiting the snap of the football from the center to the quarterback and periods of sudden extreme motion. Selecting a quantization parameter Q which is too high results in sufficient compression that frames are not lost during high motion periods but also in unnecessarily poor image quality during periods were players are stationary or moving slowly between plays. Conversely, selecting a quantization parameter Q which is too low results in better image quality during periods of low motion but likely results in loss of frames due to exceeded available bandwidth during high motion periods.

A third factor in selecting a balance between motion video image quality and conserving available bandwidth is the frame rate of the motion video signal. A higher frame rate, i.e., more frames per second, provides an appearance of smoother motion and a higher quality video image. At the same time, sending more frames in a given period of time consumes more of the available bandwidth. Conversely, a lower frame rate, i.e., fewer frames per second, consumes less of the available bandwidth but provides a motion video signal which is more difficult for the viewer to perceive as motion between frames and, below some threshold, the motion video image is perceived as a "slide show," i.e., a sequence of discrete, still, photographic images. However, intermittent loss of frames resulting from exceeding the available threshold as a result of using an excessively high frame rate provides a "jerky" motion video image which is more annoying to viewers than a regular, albeit low, frame rate.

I-frame placement and quantization parameter Q selection combine to represent a compromise between motion video image quality and conservation of available bandwidth.

However, to date, conventional motion video encoders have failed to provide satisfactory motion video image quality within the available bandwidth.

SUMMARY OF THE INVENTION

In accordance with the present invention, a primary open loop rate control selects an optimized quantization parameter Q by determining a desired size for an individual frame and comparing the size of the frame as encoded to the desired size. If the encoded frame size is greater than the desired size, quantization parameter Q is increased to reduce the size of subsequently encoded frames to consume less bandwidth at the expense of image quality. Conversely, if the encoded frame size is less than the desired size, quantization parameter Q is reduced to increase the size of subsequently encoded frames to improve image quality and to fully consume available bandwidth. As a result, each frame is encoded in a manner which maximizes image quality while approaching full consumption of available bandwidth and guarding against exceeding available bandwidth.

Further in accordance with the present invention, a secondary close loop rate control ensures that overall available bandwidth is never exceeded. Quantization parameter Q is selected by accumulating a bandwidth buffer balance which represents the amount of available bandwidth which has not been consumed by encoded frames of a video image. The bandwidth buffer balance accumulates as time passes and is consumed by encoded frames which are transmitted through the communication medium whose bandwidth is measured. Encoding frames which are consistently slightly too large results in a persistent dwindling of the reserve available bandwidth as represented in the bandwidth buffer balance. In response to the reduction of the bandwidth buffer balance below a predetermined minimum threshold, quantization parameter Q is increased to reduce the size of subsequently encoded frames to consume less bandwidth at the expense of image quality. Encoding frames which are consistently slightly too small results in a persistent accumulation of reserve available bandwidth as represented in the bandwidth buffer balance. In response to the increase in the bandwidth buffer balance above a predetermined maximum threshold, quantization parameter Q is decreased to increase the size of subsequently encoded frames to improve image quality and to fully consume available bandwidth. As a result, gradual trends of the primary open loop rate control which allow available bandwidth to accumulate or to be exceeded are thwarted. In addition, secondary closed loop rate control contributes to selecting an optimum compromise between image quality and available bandwidth.

Further in accordance with the present invention, motion video images which change from a slow changing scene to a rapidly scene are detected and quantization parameter Q is adjusted to more quickly adapted to the changing motion video signal and to continue to provide a particularly desirable compromise between image quality and available bandwidth. In particular, the absolute pixel difference between two consecutive frames is measured; the absolute pixel difference between the next two consecutive frames is measured; and the difference between the two consecutive absolute pixel differences is determined. If the magnitude of the difference between the differences is greater than a predetermined threshold, it is determined that the rate of change in the motion video signal is changing rapidly and quantization parameter Q is changed accordingly notwithstanding changes to quantization parameter Q as determined by the primary open loop rate control and secondary closed loop rate control described above. In particular, if the difference between the differences is positive, showing an increase in the rate of change between frames, quantization parameter Q is increased to reduce the size of subsequently encoded frames and to thereby make additional bandwidth available for such encoded frames. Conversely, if the difference between the differences is negative, a decrease in the rate of change between frames is detected and quantization parameter Q is decreased to improve image quality and to more fully consume available bandwidth. As a result, the optimum compromise achieved by the primary open loop rate control and the secondary closed loop rate control is more stable, i.e., reaches equilibrium more quickly, when the rate of change between frames of a motion video image changes significantly and rapidly.

Further in accordance with the present invention, a scene change between frames of a motion video signal are detected and the first frame of the new scene is encoded as an I-frame. As a result, the encoded frame is only slightly larger than an equivalent P-frame since a scene change represents a particularly large change between the current frame and the previous frame. In addition, the encoding of the next I-frame is postponed until the expiration of a full I-frame interval which starts with the encoding of the scene change I-frame, even if the previous I-frame interval had partially elapsed but had not expired prior to encoding of the I-frame. A scene change is detected by measuring the absolute pixel difference between the current frame and the previous frame and the measured absolute pixel difference is compared to a predetermined threshold. If the measured absolute difference is greater than the predetermined threshold, the current frame is determined to be the first frame of a new scene and is therefore encoded as an I- frame.

Each of these mechanisms represents a significant improvement over the prior art and enhances the quality of a motion video image without exceeding available bandwidth. These mechanisms can be used individually or in combination.

DETAILED DESCRIPTION

Figure 1:
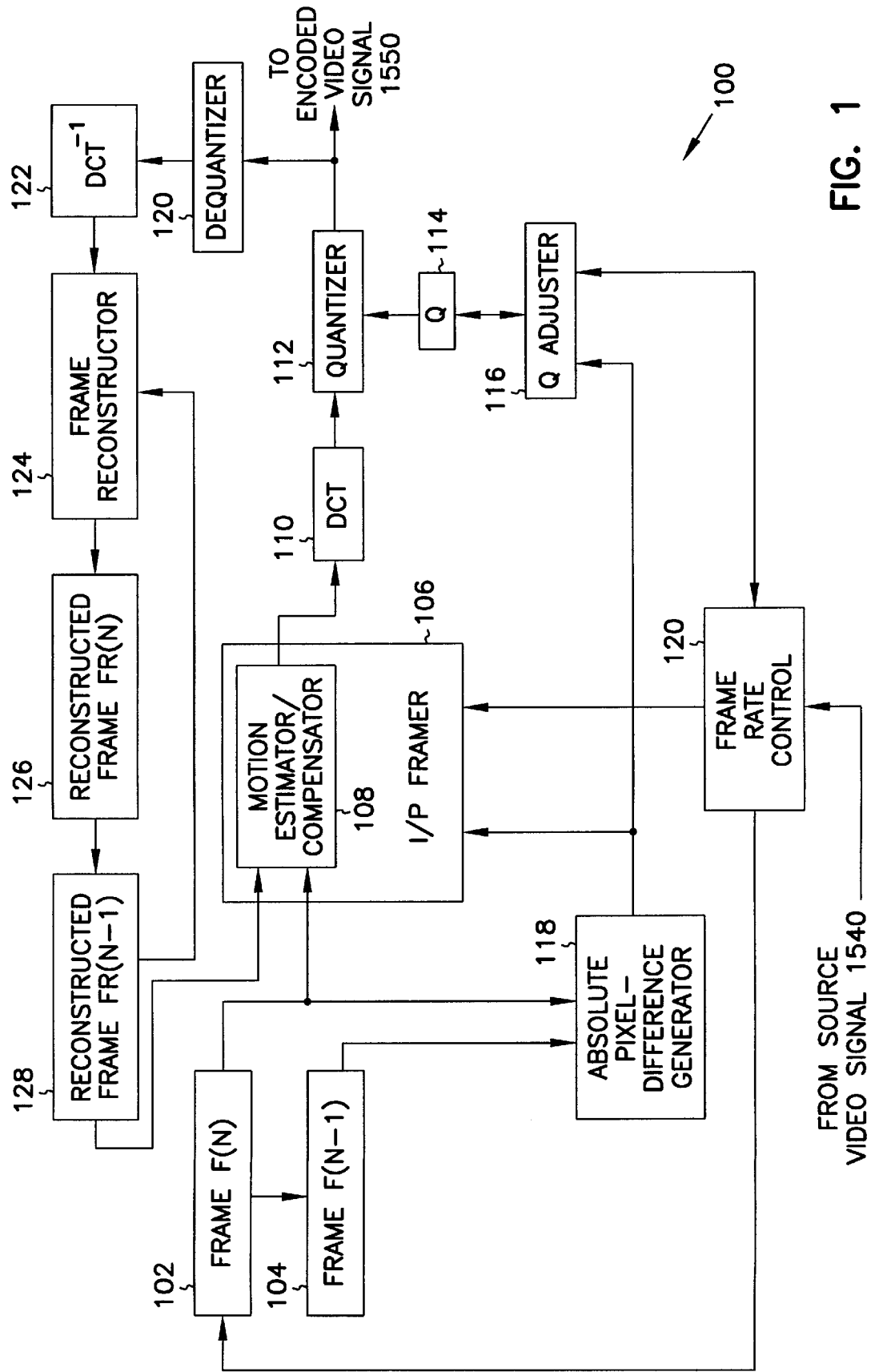
FIG. 1 is a block diagram of a video signal encoder according to the present invention.

In accordance with the present invention, a video signal encoder 100 (FIG. 1) maximizes image quality without exceeding bandwidth available for transmitting the encoded motion video signal. Video signal encoder 100 receives a frame of a video signal from a video source (not shown in FIG. 1) which can include, for example, a video camera, a video cassette player, a video laser disk player, or similar video source. Video signal encoder 100 stores the frame in buffer 102 after moving any frame previously stored in buffer 102 into buffer 104. Thus, video signal encoder 100 stores two consecutive frames in buffers 102 and 104. The frame stored in buffer 102 is sometimes referred to herein as the current frame, and the frame stored in buffer 104 is sometimes referred to herein as the previous frame. I/P framer 106 of video signal encoder 100 includes a motion estimator/compensator 108 which retrieves the current frame from buffer 102 and a reconstructed previous frame from a buffer 128 and derives motion vectors which represent motion between the current and reconstructed previous frames. The reconstructed previous frame is reconstructed from a previously encoded frame as described more completely below. For each of one or more macroblocks of the current frame, motion estimator 106 derives a motion vector which specifies a portion of the reconstructed previous frame which the macroblock corresponds and an associated motion vector error signal. A motion vector specifies a motion-compensated macroblock in terms of a vector to an equal-sized portion of another frame. A macroblock specified by a motion vector of a particular macroblock is sometimes referred to herein as a macroblock which is temporally displaced from the particular macroblock. A motion vector error signal represents an amount of variation between the macroblock and a temporally displaced macroblock of the macroblock.

Motion estimator/compensator 108 produces a current motion-compensated frame from the motion vectors and the current and reconstructed previous frames received from buffers 102 and 128. Motion estimator/compensator 108 passes the motion-compensated frame to transform coder 110 which performs direct cosine transformation (DCT) on the motion-compensated macroblocks of the motion-compensated frame to produce a transformed frame. Transform coder 110 passes the transformed frame to a quantizer 112. Quantizer 112 quantizes coefficients used in transform coder 110 and these coefficients are then used later for Huff-man coding the transformed frame to complete compression of the current frame retrieved from buffer 102. Huffinan coding is described more completely in copending U.S. application Ser. No. 08/818,805, filed Mar. 14, 1997, entitled "Method and Apparatus for Implementing Motion Detection in Video Compression," and that description is incorporated herein by reference.

As described briefly above, a reconstructed previous frame is used to estimate motion between consecutive frames. The reconstructed previous frame is formed as follows. A dequantizer 120 receives the encoded current frame from quantizer 112 and performs the inverse of the quantization performed by quantizer 112. The dequantized frame is transferred from dequantizer 120 to a transform decoder 122 which performs an inverse direct cosine transformation of the DCT performed by transform coder 110. A frame reconstructor 124 receives the transformed frame and reconstructs a reconstructed current frame therefrom. Specifically, frame reconstructor 124 reconstructs motion-compensated macroblocks of the frame received from transform decoder 122 by reference to a previously reconstructed frame stored in buffer 128. The reconstructed current frame is stored in a buffer 126 and the reconstructed frame which is previously stored in buffer 126 is moved to buffer 128. Therefore buffer 128 stores a reconstructed previous frame which is reconstructed from the previously encoded frame. Dequantizer 120, transform decoder 122, and frame reconstructor 124 are conventional.

Quantization by quantizer 112 is important in the encoding of a frame because a significant loss of signal for the sake of better compression can happen during quantization of the transform parameters. Quantization of coefficients used in transform coder 112 is known and is described, for example, in ITU-T Recommendation H.263 and that discussion is incorporated herein by reference. Quantization involves a quantization parameter, Q 114, which represents a selected compromise between signal resolution in the encoded video signal and the degree of compression realized in encoding the video signal. In general, a larger Q 114 results in a greater degree of compression, and thus less consumed bandwidth, at the expense of greater signal loss. Conversely, a smaller Q 114 generally results in less signal loss at the expense of a smaller degree of compression and thus greater consumed bandwidth.

As described above in greater detail, the appropriate Q 114 for a given motion video signal depends on the particular subject matter of the particular motion video signal and, in fact, can change dramatically within a given motion video signal. Accordingly, Q 114 is controlled by a Q adjuster 116. Q adjuster 116 is shown in greater detail in FIG. 2. Q adjuster includes generally two Q adjustment mechanisms. The first includes a primary open loop rate control 202 and a secondary closed loop rate control 204. The second includes a Q pre-compensator 206.

In general, primary open loop rate control 202 (FIG. 2) adjusts Q 114 for each P-frame to achieve a desired size of encoded P-frame. Processing of the primary open loop rate control is illustrated generally by logic flow diagram 300 (FIG. 3) in which processing begins with loop step 302. Loop step 302, in conjunction with next step 314, defines a loop in which each P-frame is processed according to steps 304–312. In step 304, primary open loop rate control 202 (FIG. 2) determines a target size for the current P-frame. In general, the target size represents an ideal size for the current P-frame such that exactly the available bandwidth is completely consumed by the motion video stream produced by video signal encoder 100 (FIG. 1). First, the amount of total bandwidth occupied by I-frames is determined and subtracted from the total bandwidth to determine the amount of bandwidth available for P-frames. In one embodiment, an I-frame is encoded every 6.5 seconds in a frame rate of 10 frames per second, and I-frames occupy about 10–15% of the available bandwidth. Accordingly, 85–90% of the total available bandwidth is available for P-frames. The target frame size for the current P-frame is determined from the time elapsed between the current P-frame and the previous frame and the amount of total available bandwidth for P-frames. If P-frames are encoded in such a way that each P-frame is smaller than the target size, then additional bandwidth is available and video image quality is unnecessarily poor. Conversely, if P-frames are encoded in such a way that each P-frame is larger than the target size, then the available bandwidth will eventually be exceeded.

In test step 306, primary open loop rate control 202 (FIG. 2) determines whether the current frame is larger than the target size. If the current frame is larger than the target size, processing transfers from test step 306 (FIG. 3) to step 308. In step 308, primary open loop rate control 202 (FIG. 2) increases Q 114 to thereby cause subsequent frames to be encoded at with an increased degree of compression and a commensurate degradation of motion video image quality. By increasing the degree of compression of the motion video signal, exceeding the available bandwidth is avoided.

In one embodiment, Q 114 is increased 1% for every 10% of the target size exceeded by the size of the current P-frame. In this illustrative embodiment, Q 114 is stored as a floating point number to perpetuate fine adjustments in Q 114. However, when used by quantizer 112 (FIG. 1), Q 114 must generally have an integer value between one (1) and thirty-one (31). Therefore, the nearest integer to Q 114 is used by quantizer 112 to quantize the transformed frame received from transform coder 110. As a result, small changes in Q 114 are represented and preserved in the fractional portion of Q 114 while changes in the quantization of the frames of the motion video signal occur only when Q 114 changes sufficiently to change the integer to which the value of Q 114 is nearest.

In general, it is preferred that Q 114 (FIGS. 1 and 2) Q 114 changes sufficiently to quickly converge to a relatively optimum value such that image quality is maximized while available bandwidth is not exceeded. However, configuring Q adjuster 116 to adjust Q 114 excessively to converge too quickly because doing so can cause the value of Q 114 can be over-adjusted such that correction in the reverse direction is required for subsequent frames, thereby causing the value of Q 114 to oscillate. Such oscillation can produce perceptible and undesirable artifacts in the decoded motion video signal. Therefore, it is preferred that Q 114 changes quickly enough to converge quickly to a relatively optimum value but changes slowly enough to avoid oscillation about the relatively optimum value. The adjustments Q 114 described herein have been determined to provide acceptable results.

After step 308, processing of the current P-frame by primary open loop rate control 202 is complete.

If, in test step 306, primary open loop rate control 202 determines that the size of the current frame is not larger than the target size, processing transfers to test step 310. In test step 310, primary open loop rate control 202 determines whether the size of the current frame is smaller than the target size. If the size of the current frame is not smaller than the target size, processing of the current P-frame by primary open loop rate control 202 is complete. Thus, if the size of the current P-frame is equal to the target size, Q 114 is not adjusted by primary open loop rate control 202. Conversely, if the size of the current frame is smaller than the target size, processing transfers from test step 310 to step 312.

In step 312, primary open loop rate control 202 decreases Q 114 to increase the image quality of subsequent P-frames and to more completely utilize the bandwidth available for encoding of P-frames. In one embodiment, Q 114 is decreased 1% for every 2.5% of the target size which exceeds the size of the current P-frame. After step 312, processing of the current P-frame by primary open loop rate control 202 is complete.

Thus, primary open loop rate control 202 determines an appropriate and relatively optimum compromise between image quality and bandwidth availability by comparing the size of the current encoded P-frame to a target, theoretically optimum, encoded P-frame size. However, use of primary open loop rate control 202 alone does not guarantee that the total available bandwidth will not be exceeded. For example, if P-frames are consistently slightly larger than the target size, available bandwidth can be eventually exceeded. Therefore, secondary closed loop rate control 204 uses a cumulative bandwidth buffer to ensure that the total available bandwidth is never exceeded.

Secondary closed loop rate control 204 monitors a cumulative bandwidth balance to ensure that small cumulative excesses of bandwidth overlooked by primary open loop rate control 202 do not result in the encoded motion video signal exceeding the overall available bandwidth. Specifically, if the cumulative bandwidth balance deviates too far from a desired cumulative bandwidth balance, adjustments to Q 114 by secondary closed loop rate control 204 are large enough to compensate for any adjustments to Q 114 by primary open loop rate control 202.

Figure 4:
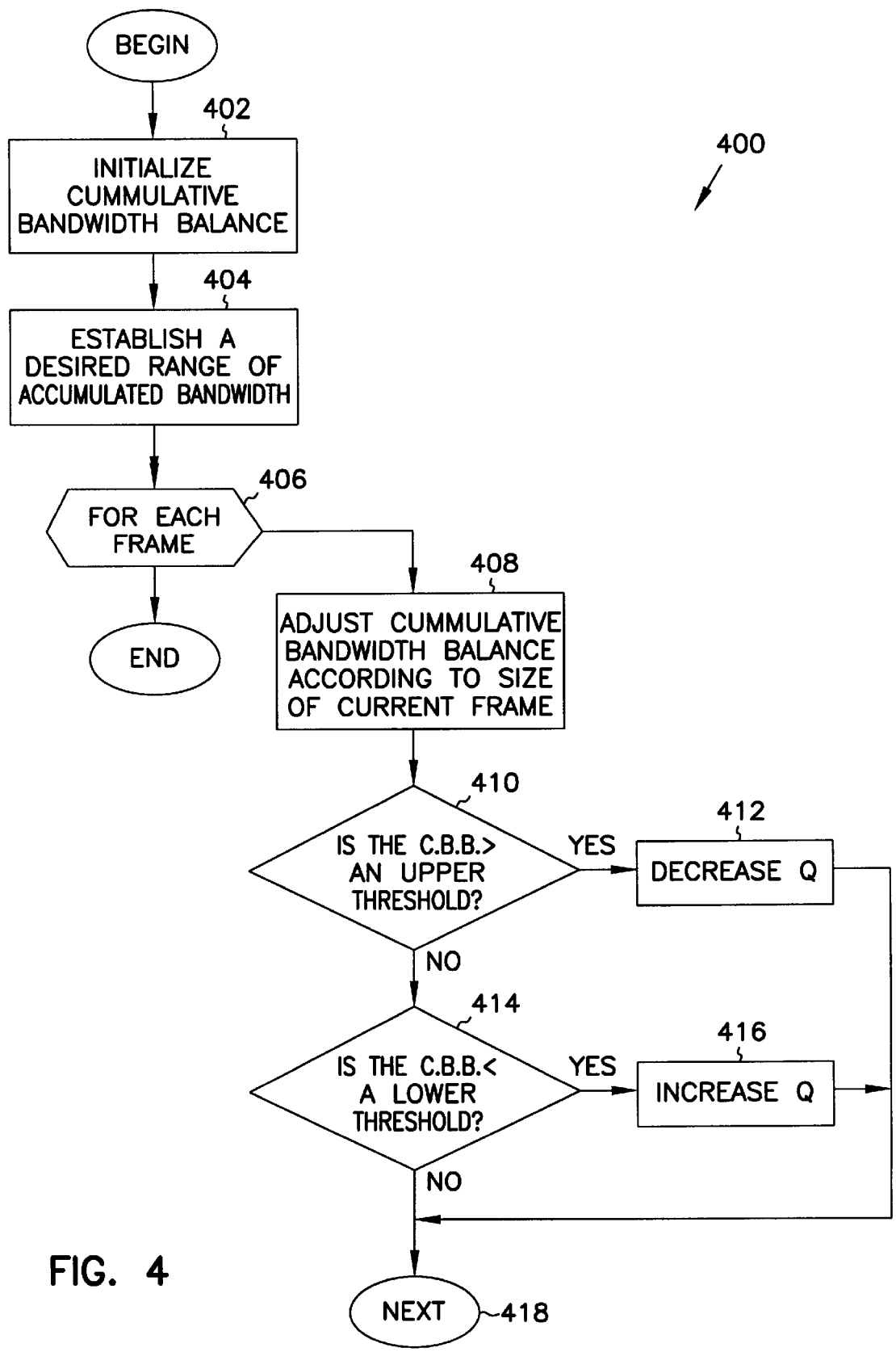
FIG. 4 is a logic flow diagram illustrating the processing of the secondary close loop rate control of FIG. 2.

Processing by secondary closed loop rate control 204 is illustrated in logic flow diagram 400 (FIG. 4) in which processing begins in step 402. In step 402, secondary closed loop rate control 204 initializes a cumulative bandwidth balance to represent the amount of reserve bandwidth available when secondary closed loop rate control 204 initially begins processing. In one embodiment, the cumulative bandwidth balance indicates that a buffer whose target size is equivalent to three (3) seconds of motion video signal exists. In step 404, secondary closed loop rate control 204 deterinnes a desired range of within which the cumulative bandwidth balance should remain. In one embodiment, the desired range is plus or minus one (1) second. An excessively small buffer provides too little buffering to compensate for variances in processing and delivery medium throughput. Conversely, an excessively large buffer delays client playback of a motion video signal by the amount of buffered motion video signal and results in annoying delays in real-time motion video signal delivery applications such as video conferencing.

Loop step 406 and next step 418 define a loop in which each frame, both I-frames and P-frames, are processed according to steps 408–416. In step 408, secondary closed loop rate control 204 adjusts the cumulative bandwidth balance according to the size of the current frame. In particular, secondary closed loop rate control 204 adds to the cumulative bandwidth balance time which elapses between the previous frame and the current frame and subtracts from the cumulative bandwidth balance the amount of bandwidth time consumed by the current frame. In one embodiment, the bandwidth time is measured in terms of seconds. In particular, since bandwidth is expressed in an amount of data per period of time (e.g., kilobits per second), the size of the current frame, which is expressed in terms of an amount of data, divided by bandwidth results in a measure of bandwidth time consumed by the current frame. A particularly large frame, such as an I-frame for example, consumes more bandwidth time than elapses between the current frame and the preceding frame. Accordingly, secondary closed loop rate control 204 notes a reduction in the cumulative bandwidth balance. Conversely, a particularly small frame consumes less bandwidth time than elapses between the current frame and a preceding frame and results in an increase in the cumulative bandwidth balance.

In test step 410, secondary closed loop rate control 204 determines whether the cumulative bandwidth balance is greater than the upper threshold of the range determined in step 404. If the cumulative bandwidth balance is within the desired range, processing transfers to test step 414 which is described more completely below. Conversely, if the cumulative bandwidth balance is greater than the desired range, excess bandwidth is accumulating and processing transfers to step 412 in which secondary closed loop rate control 204 decreases Q 114. Accordingly, video image quality is increased at the expense of increased bandwidth consumed by subsequent frames. This is appropriate since unused accumulating bandwidth is detected and using such bandwidth improves the overall perceived quality of the motion video image. In one embodiment, Q 114 is adjusted 1% for every 3% of the upper threshold that is exceeded by the cumulative bandwidth buffer. After step 412, processing of the current frame by secondary closed loop rate control 204 completes.

In test step 414, secondary closed loop rate control 204 determines whether the cumulative bandwidth balance is less than the lower threshold of the desired range determined in step 404. If the cumulative bandwidth is within the desired range, processing of the current frame by secondary closed loop rate control 204 completes. Conversely, if the cumulative bandwidth balance is below the desired range, bandwidth is being consumed at too great a rate and processing transfers to step 416 in which secondary closed loop rate control 204 increases Q 114. Accordingly, image quality is sacrificed to conserve bandwidth used by subsequent frames. Therefore, small excesses in consumed bandwidth which are undetected by primary open loop rate control 202 but which accumulate over time are detected by secondary closed loop rate control 204 and available bandwidth is not exceeded. In one embodiment, Q 114 is adjusted 1% for every 3% of the lower threshold that exceeds the cumulative bandwidth buffer. After step 416, processing of the current frame by secondary closed loop rate control 204 completes.

Figure 2:
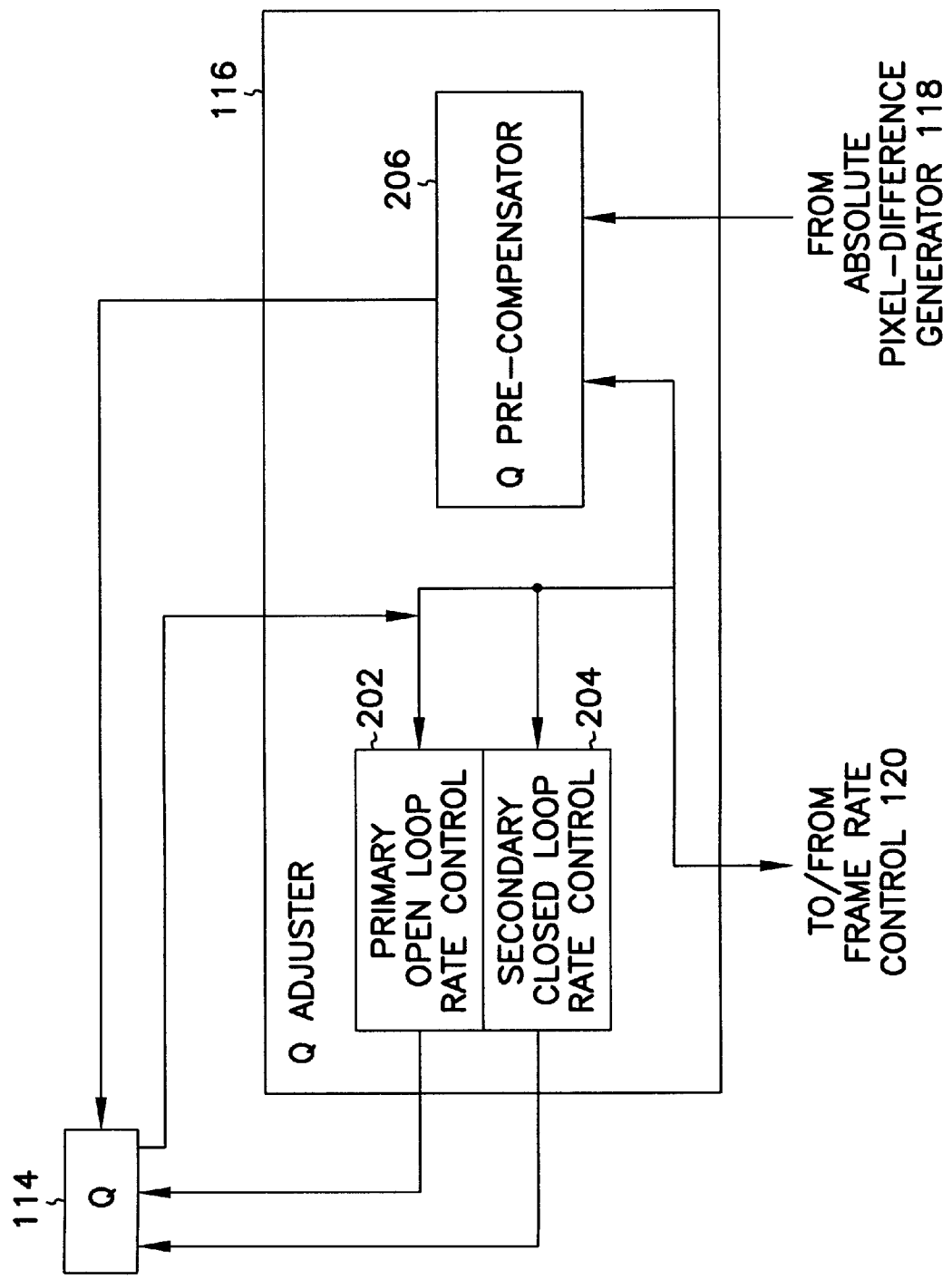
FIG. 2 is a block diagram of the quantization parameter Q adjuster of FIG. 1.
Figure 3:
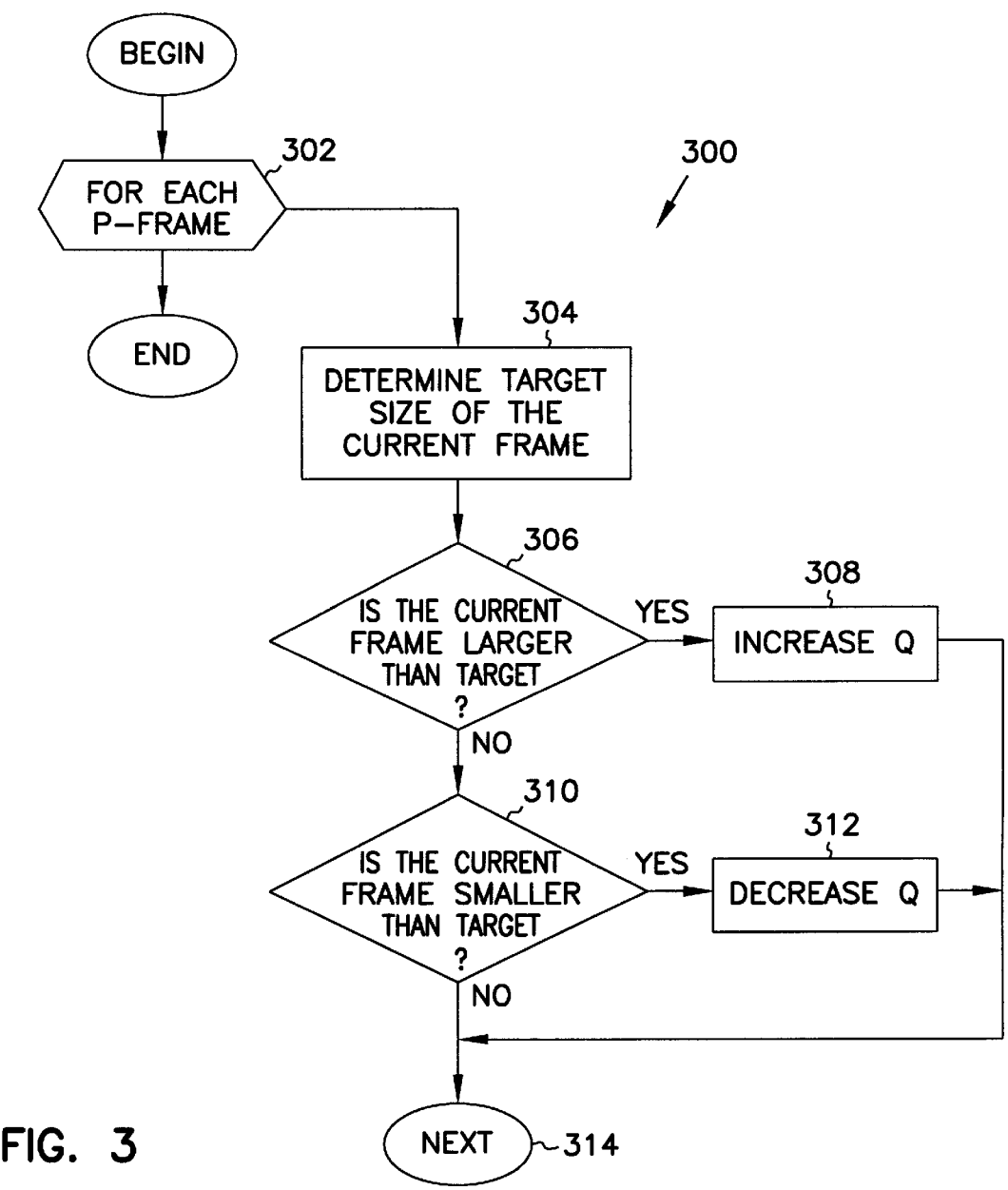
FIG. 3 is a logic flow diagram illustrating the processing of the primary open loop rate control of FIG. 2.

The result of processing according to logic flow diagram 400 (FIG. 4) is a cyclical fluctuation of the cumulative bandwidth balance. Processing each I-frame, which is typically many times larger than the average P-frame, results in a sudden and dramatic decrease in the cumulative bandwidth balance to a locally minimum value. However, each I-frame is typically followed by a number of P-frames, processing of which results in small, incremental increases in the cumulative bandwidth balance. The cumulative bandwidth balance typically has a locally maximum balance immediately prior to processing of an I-frame by secondary closed loop rate control 204 (FIG. 2). The cumulative bandwidth balance therefore fluctuates cyclically with a period which substantially coincides with the I-frame interval.

The rather large bandwidth deficit caused by encoding the initial I-frame can cause undesirable effects. The first frame of any video stream is an I-frame since there is no previous frame on which to base motion-compensated macroblocks. The cumulative bandwidth balance therefore indicates a rather large bandwidth deficit (or a rather large reduction in bandwidth surplus) after processing the first frame. One potential result is that, in processing early frames in the motion video signal, secondary closed loop rate control 204 adjusts Q 114 too dramatically and causes undesirable effects which eventually disappear as the cumulative bandwidth balance reaches an equilibrium. The desired range of the cumulative bandwidth balance is therefore adjusted to take into consideration the fact that the cumulative bandwidth balance is skewed toward indicating insufficient bandwidth early in the processing of the frames of a video stream. In one embodiment, the desired cumulative bandwidth balance is adjusted to include an additional bandwidth deficit of one-quarter of a second, i.e., to range from 1.75–3.75 seconds rather than from 2–4 seconds. In this way, undesirable effects early in the processing of a video stream are avoided.

Thus, primary open loop rate control 202 adjusts Q 114 for each frame to reach an optimum compromise between image quality and conserved bandwidth while secondary closed loop rate control 204 ensures that small excessive uses of bandwidth don't accumulate such that frames are ultimately lost as a result of exceeding available bandwidth. It should be noted that adjustments to Q 114 in steps 412 (FIG. 4) and 416 are in addition to those made in steps 308 (FIG. 3) and 312. Accordingly, significant deviations from the desired range of the cumulative buffer balance resulting from small, incremental deviations from the target frame size permitted by primary open loop rate control 202 result in significant corrections by secondary closed loop rate control 204 which can overcome corrections to Q 114 made by primary open loop rate control 202 to guarantee that available bandwidth is not exceeded.

Figure 5:
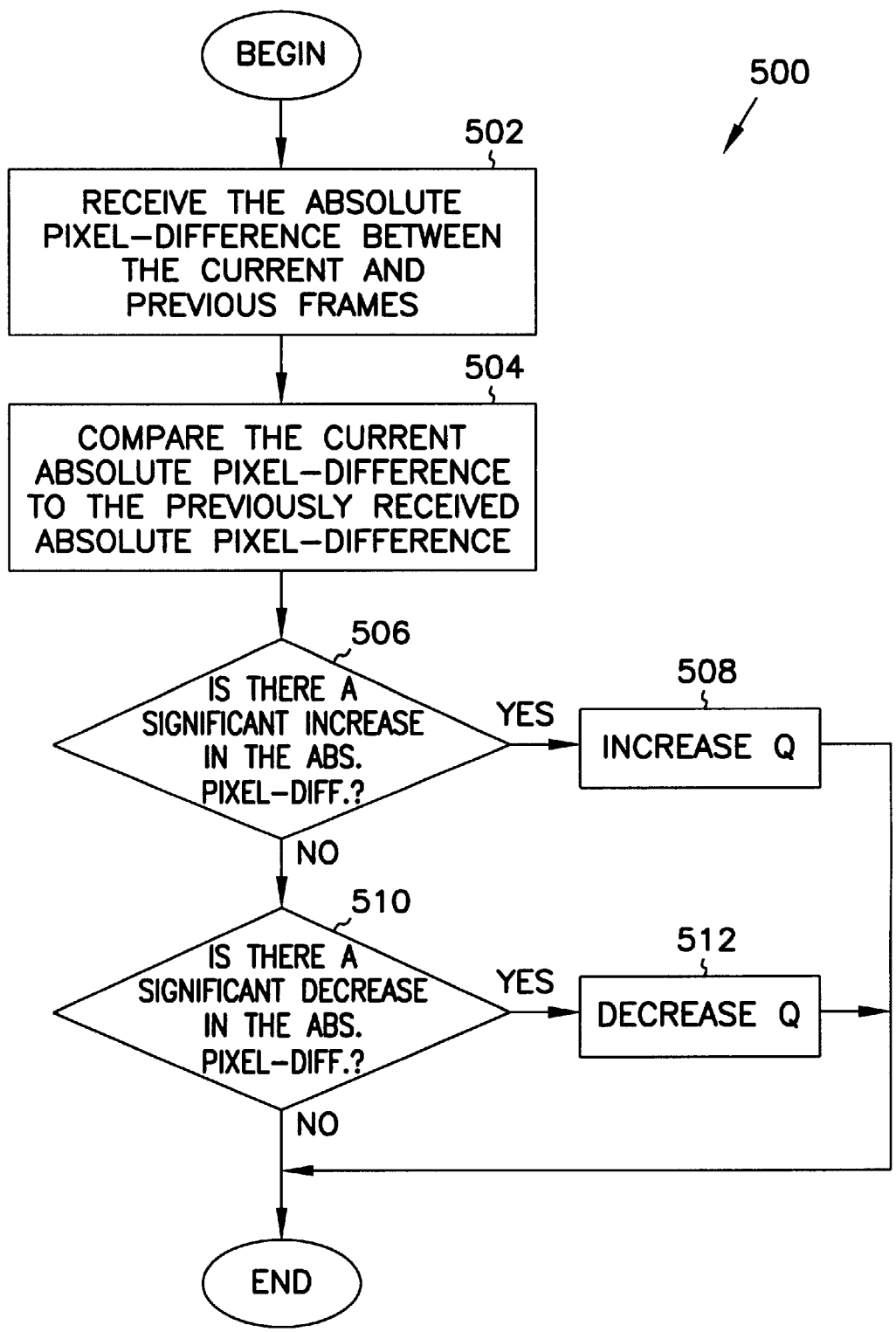
FIG. 5 is a logic flow diagram illustrating the processing of the Q pre-compensator.of FIG. 2.

While primary open loop rate control 202 (FIG. 2) and secondary closed loop rate control 204 combine to quickly and effectively strike a near perfect balance between image quality and available bandwidth, quicker adjustments in Q 114 aided by Q pre-compensator 206 improve sudden transitions between high-motion and low-motion sequences of frames. Processing by Q pre-compensator 206 is illustrated in logic flow diagram 500 (FIG. 5) in which processing begins in step 502. In step 502, Q pre-compensator 206 (FIG. 2) receives from absolute pixel difference generator 118 (FIG. 1) an absolute pixel difference between the current frame and the previous frame. An absolute pixel difference between two frames is the average of the absolute value of the difference of each pair of corresponding pixels of the two frames. Absolute pixel difference generator 118 retrieves the current and previous frames from buffers 102 and 104, respectively, and determines the absolute value of the difference between corresponding pixels of the current and previous frames. From these determined absolute differences, absolute pixel difference generator 118 determines the average absolute difference per pixel between the two frames. The absolute pixel difference is a good indicator of overall differences between two frames. In contrast, root-mean-square differences between corresponding pixels of two frames exaggerates large differences between only a few pixels of the frames.

In step 504 (FIG. 5), Q pre-compensator 206 (FIG. 2) compares the absolute pixel difference received from absolute pixel difference generator 118 to the last absolute pixel difference previously received from absolute pixel difference generator 118. In test step 506 (FIG. 5), Q pre-compensator 206 (FIG. 2) determines if there is a significant increase, e.g., an increase of five (5) or more, in the absolute pixel difference. A significant increase suggests either a sudden increase in motion between the frames or an otherwise rapidly changing scene. Accordingly, prior estimates for an appropriate value for Q 114 by primary open loop rate control 202 and secondary closed loop rate control 204 are probably inappropriate for the current frame and the likelihood that the current frame, as encoded, will be too large given the current state of Q 114 is increased. Therefore, in such a case, processing transfers to step 508 (FIG. 5) in which Q pre-compensator 206 (FIG. 2) increases Q 114. Unlike steps 308 (FIG. 3) and 416 (FIG. 4) in which the current encoded frame is used to determine whether to adjust Q 114, in step 508 (FIG. 5) and in step 512 described below, Q pre-compensator 206 (FIG. 2) increases Q 114 prior to quantization of the current frame. As a result, de-stabilization of quantization in accordance with primary open loop rate control 202 and secondary closed loop rate control 204 by sudden changes in the motion video signal, e.g., sudden increases or decreases in motion, is avoided. After step 508 (FIG. 5), processing by Q pre-compensator 206 (FIG. 2) completes.

Conversely, if Q pre-compensator 206 determines in test step 506 (FIG. 5) that there is no significant increase in the absolute pixel difference between the current and previous frames, processing transfers to test step 510. In test step 510, Q pre-compensator 206 (FIG. 2) determines if there is a significant decrease, e.g., a decrease of five (5) or more, in the absolute pixel difference. A significant decrease suggests either a sudden decrease in motion between the frames or a scene with otherwise sudden decreases the amount of change between frames. Accordingly, prior estimates for an appropriate value for Q 114 by primary open loop rate control 202 and secondary closed loop rate control 204 are probably inappropriate for the current frame and the likelihood that the current frame, as encoded, will have unnecessarily poor quality given the current state of Q 114 is increased. Therefore, in such a case, processing transfers to step 512 (FIG. 5) in which Q pre-compensator 206 (FIG. 2) decreases Q 114. Q pre-compensator 206 increases Q 114 prior to quantization of the current frame in step 512 (FIG. 5) as described above. After step 512, processing by Q pre-compensator 206 completes. In addition, if Q pre-compensator 206 (FIG. 2) determines in test step 510 (FIG. 5) that there is no significant decrease in the absolute pixel difference between the current and previous frames, processing by Q pre-compensator 206 completes immediately following test step 510.

Thus, Q pre-compensator 206 detects sudden changes in the amount of differences between frames of a motion video signal and pre-adjusts Q 114 in anticipation of such sudden changes. As a result, artifacts and undesirable effects resulting from such sudden changes are reduced considerable and, in some cases, avoided altogether.

The amount of adjustment of Q 114 by Q pre-compensator 206 in steps 508 (FIG. 5) and 512 is determined according to a ratio of the absolute pixel difference and the available bandwidth. In one embodiment, the ratio is given by the following equation.

$$r = apd/k, \text{ where } k = \text{MAX}(2, \text{bandwidth}/10000) \qquad (1)$$

In equation (1), apd is the absolute pixel difference and the bandwidth is measured in bits per second. The ratio r is limited to no more than apd/2 to prevent excessive variations in Q 114 when the bandwidth is particularly low. In step 508 (FIG. 5), the amount by which Q pre-compensator 206 (FIG. 2) increases Q 114 is limited to a maximum of fifteen (15) because particularly large absolute pixel differences predict with less accuracy the size of an encoded frame. In step 512 (FIG. 5), the amount by which Q pre-compensator 206 (FIG. 2) decreases Q 114 is limited to a maximum of (i) ten (10) or (ii) 25% of the current value of Q 114, whichever is less. Excessively large reductions in Q 114 can produce excessively large frames which would consume unacceptable amounts of available bandwidth.

I-Frame Placement

As described above, I-frame placement is an important consideration in achieving an optimum balance between motion video image quality and available bandwidth. In addition, an I-frame interval of approximately 6.5 seconds, irrespective of frame rate, is used in one embodiment as described above. However, when a scene changes in a motion video signal, i.e., when the current frame is generally unrelated to the previous frame, encoding the current frame as a P-frame requires nearly as much bandwidth as encoding the current frame as an I-frame. In addition, encoding the current frame as an I-frame eliminates noise which is perpetuated from P-frame to P-frame. Therefore, I/P framer 106 (FIG. 1) detects a scene change and, when a scene change is detected, encodes the current frame as an I-frame irrespective of the I-frame interval. Furthermore, graphical user interfaces which allow a user to skip forward or backward in the series of frames typically display only the encoded I-frames to simulate fast-forward or rewind playback. By encoding the first frame of a new scene as an I-frame, the user can skip forward or backward to the first frame of a particular scene.

Figure 6:
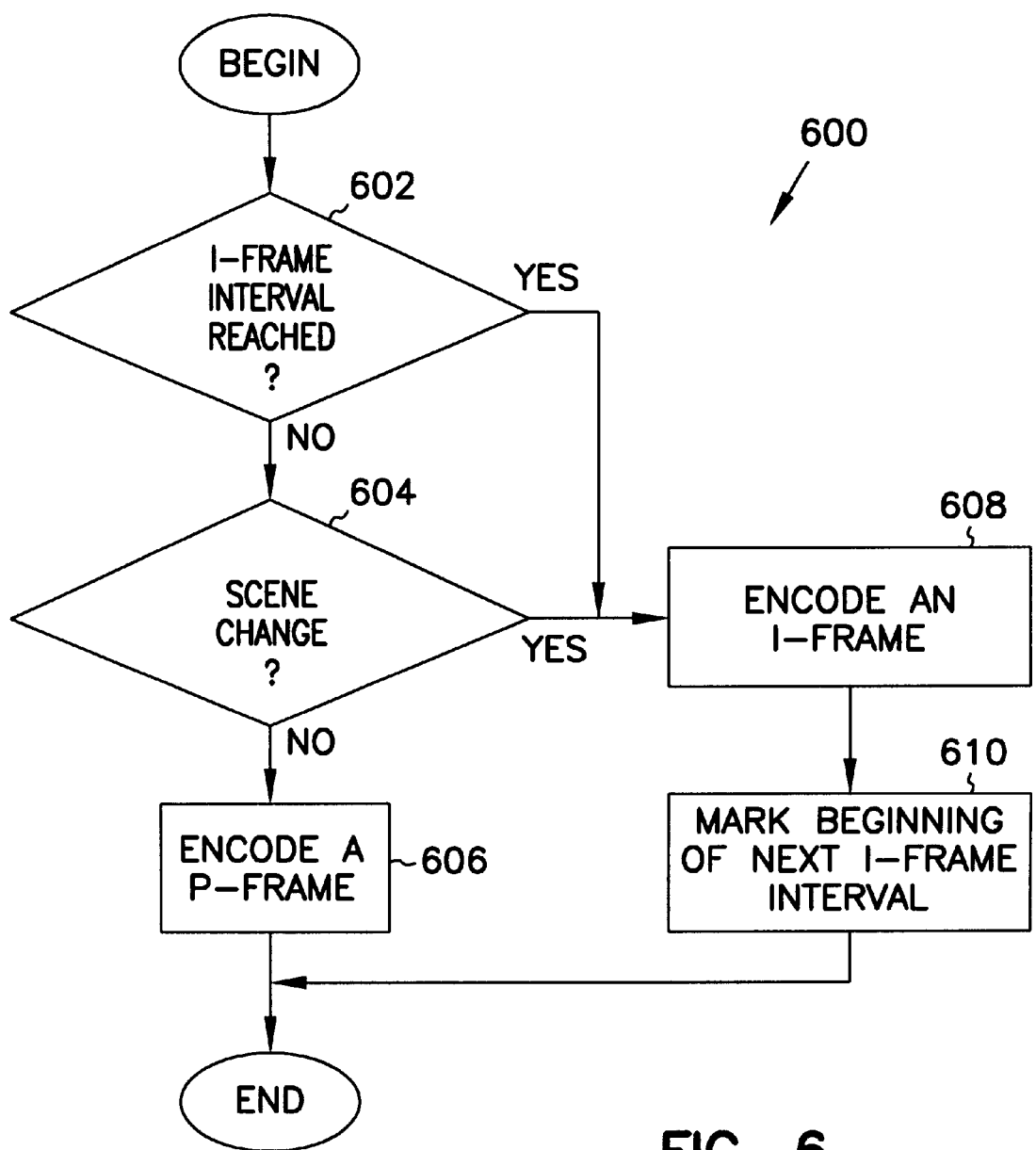
FIG. 6 is a logic flow diagram illustrating the processing of the I/P framer of FIG. 1.

Processing by I/P framer 106 is illustrated in logic flow diagram 600 (FIG. 6) in which processing begins in test step 602. In test step 602, I/P framer 106 (FIG. 1) determines whether an I-frame interval has expired. I/P framer 106 makes such a determination by recording the time of the last frame which is encoded as an I-frame and comparing that time to the time of the current frame. I/P framer 106 determines time according to a conventional computer system clock in one embodiment. In this illustrative example, the I-frame interval is 6.5 seconds. Therefore, in test step 602 (FIG. 6), I/P framer 106 (FIG. 1) compares the time elapsing between the most recently encoded I-frame and the current frame to 6.5 seconds. If 6.5 seconds have elapsed between the most recently encoded I-frame and the current frame, processing transfers to step 608 in which I/P framer 106 encodes the current frame as an I-frame. Conversely, if 6.5 seconds has not elapsed, processing transfers to test step 604.

In test step 604, I/P framer determines whether the current frame represents a scene change in the motion video signal. The manner in which I/P framer 106 makes such a determination is described below in greater detail in conjunction with logic flow diagram 604 which shows test step 604 more completely. If I/P framer 106 determines that the current represents a scene change in the motion video signal, processing transfers to step 608 in which I/P framer 106 encodes the current frame as an I-frame. Conversely, if I/P framer 106 determines that the current does not represent a scene change in the motion video signal, processing transfers to step 606 in which I/P framer 106 encodes the current frame as a P-frame. Thus, if the current frame represents a scene change or the I-frame interval has expired, I/P framer 106 encodes the current frame as an I-frame. Otherwise, I/P framer 106 encodes the current frame as a P-frame.

After step 608, I/P framer 106 marks the beginning of the next I-frame interval in step 610 since an I-frame is encoded in step 608. Thus, absent another scene change in less than 6.5 seconds, the next I-frame will be encode in 6.5 seconds regardless of when the last I-frame was encoded. In other words, if a scene changes 6.4 seconds into an I-frame interval, encoding another I-frame in 0.1 seconds would unnecessarily consume significant bandwidth and such is avoided. After step 606 or 610, processing of the current frame by I/P framer 106 completes.

Figure 7:
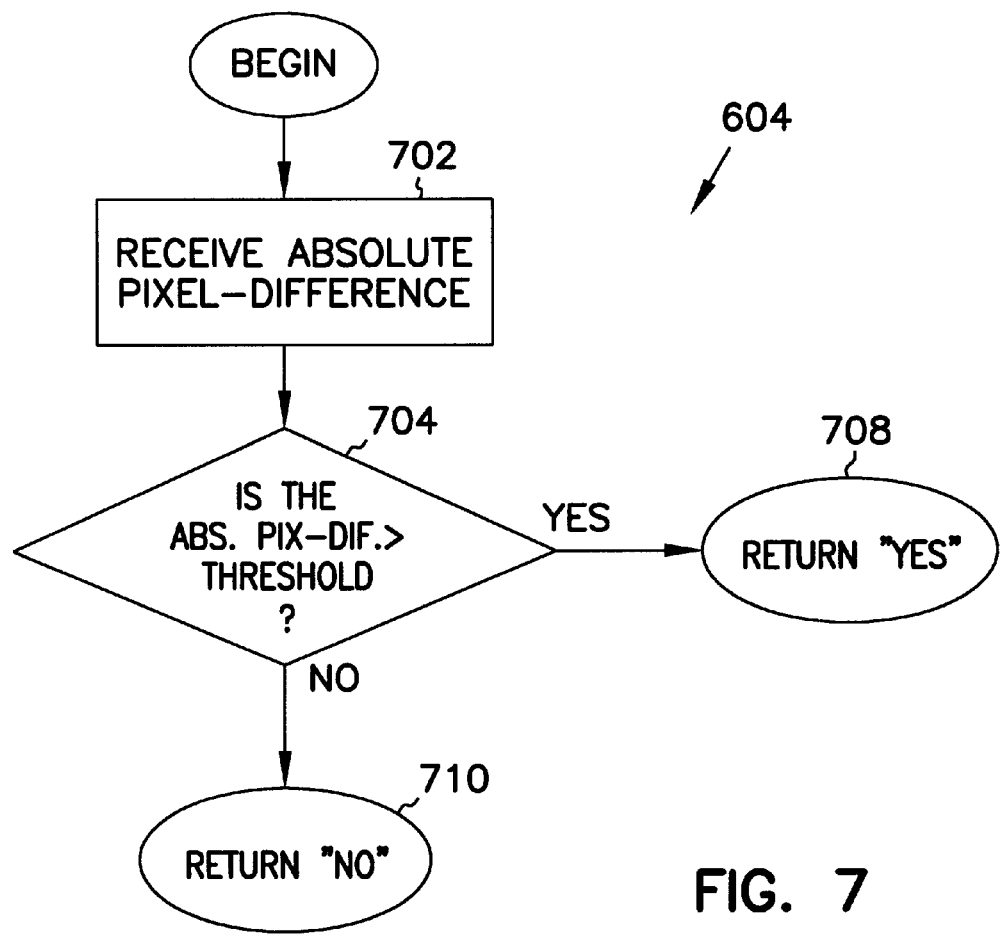
FIG. 7 is a logic flow diagram illustrating the determination by the I/P framer of FIG. 1 that the current frame of a motion video signal represents a scene change.

As described briefly above, I/P framer 106 determines whether the current frame represents a scene change in the motion video signal in test step 604 which is shown in greater detail as logic flow diagram 604 (FIG. 7). Processing according to logic flow diagram 604 begins with step 702 in which I/P framer 106 receives the absolute pixel difference from absolute pixel difference generator 118. Thus, the absolute pixel difference produced by absolute pixel difference generator 118 is used by both I/P framer 106 and Q adjuster 116. The absolute pixel difference is described above in greater detail and represents a measurement of the degree of change between the current frame and the previous frame. As described above, the absolute pixel difference is less susceptible to large changes in relatively view pixels and is therefore used to measure more accurately the degree of change between the frames as a whole.

Processing transfers from step 702 to test step 704 in which I/P framer 106 compares the absolute pixel difference to a first predetermined threshold. In one embodiment, the first predetermined threshold is an absolute pixel difference of twenty (20). In this embodiment, the luminance of each pixel is represented by eight bits and ranges in value from 0 to 255. Scene changes typically result in absolute pixel differences which range from about 20 to 80 or more. In contrast, high motion typically results in absolute pixel differences which range from about 8 to about 12. If I/P framer 106 determines that the absolute pixel difference received in step 702 is greater than the first predetermined threshold, I/P framer 106 determines that the current frame represents a scene change and processing transfers to terminal step 708 and that determination is reflected in terminal step 708. Processing according to logic flow diagram 604, and therefore step 604 (FIG. 6), terminates in step 708 (FIG. 7).

In one embodiment, I/P framer 106 disregards absolute pixel differences greater than twenty (20) when a high motion sequence is detected. I/P framer 106 detects a high motion sequence when two consecutive absolute pixel differences are each greater than ten (10). By disregarding absolute pixel differences greater than twenty (20) in high motion sequences, misinterpreting high motion sequences as including multiple scene changes is avoided. Mistaking high motion scenes as many, frequent scene changes and encoding many frames as I-frames can very quickly consume excessive amounts of bandwidth. By avoiding such a mistake, the relatively small bandwidth savings from encoding such P-frames, which are particularly valuable in high motion sequence, are realized. I/P framer 106 detects that a high motion sequence has terminated whenever absolute pixel-difference generator 118 measures an absolute pixel difference which is not greater than ten (10). When a high motion sequence terminates, I/P framer 106 detects scene changes and encodes I-frames at the detected scene changes in the manner described above.

Thus, by comparing the amount of changes between consecutive frames to a predetermined threshold, I/P framer 106 recognizes scene changes and avoids encoding P-frames which do not realize significant bandwidth savings over equivalent I-frames. In other words, encoding the first frame of a new scene as a P-frame results in a P-frame which is practically the same size as an I-frame. In addition, since the I-frame interval is shifted at scene changes in the manner described above, encoding the next I-frame can be postponed until the expiration of a full I-frame interval. The following example is illustrative. Consider a scene change mid-way through an I-frame interval. Conventional systems encode a P-frame, which is substantially equivalent in size to an I-frame, at the scene change and encode an I-frame 3.25 seconds later (after one-half of the I-frame interval). In contrast, I/P framer 106 encodes the scene change as an I-frame and does not encode another I-frame until one full I-frame interval has elapsed, unless another scene change is detected prior to expiration of the full I-frame interval. Such provides a particularly efficient use of available bandwidth without unnecessarily sacrificing video image quality.

Frame Rate Control

As described above, another important consideration in maximizing motion video image quality within limited bandwidth is the frame rate, i.e., the number of frames encoded in a particular period of time. Video signal encoder 100 includes a frame rate controller 120 which adjusts the frame rate of the encoded video signal as necessary to preserve the motion video signal quality and to prevent loss of frames due to exceeded bandwidth limitations.

Figure 8:
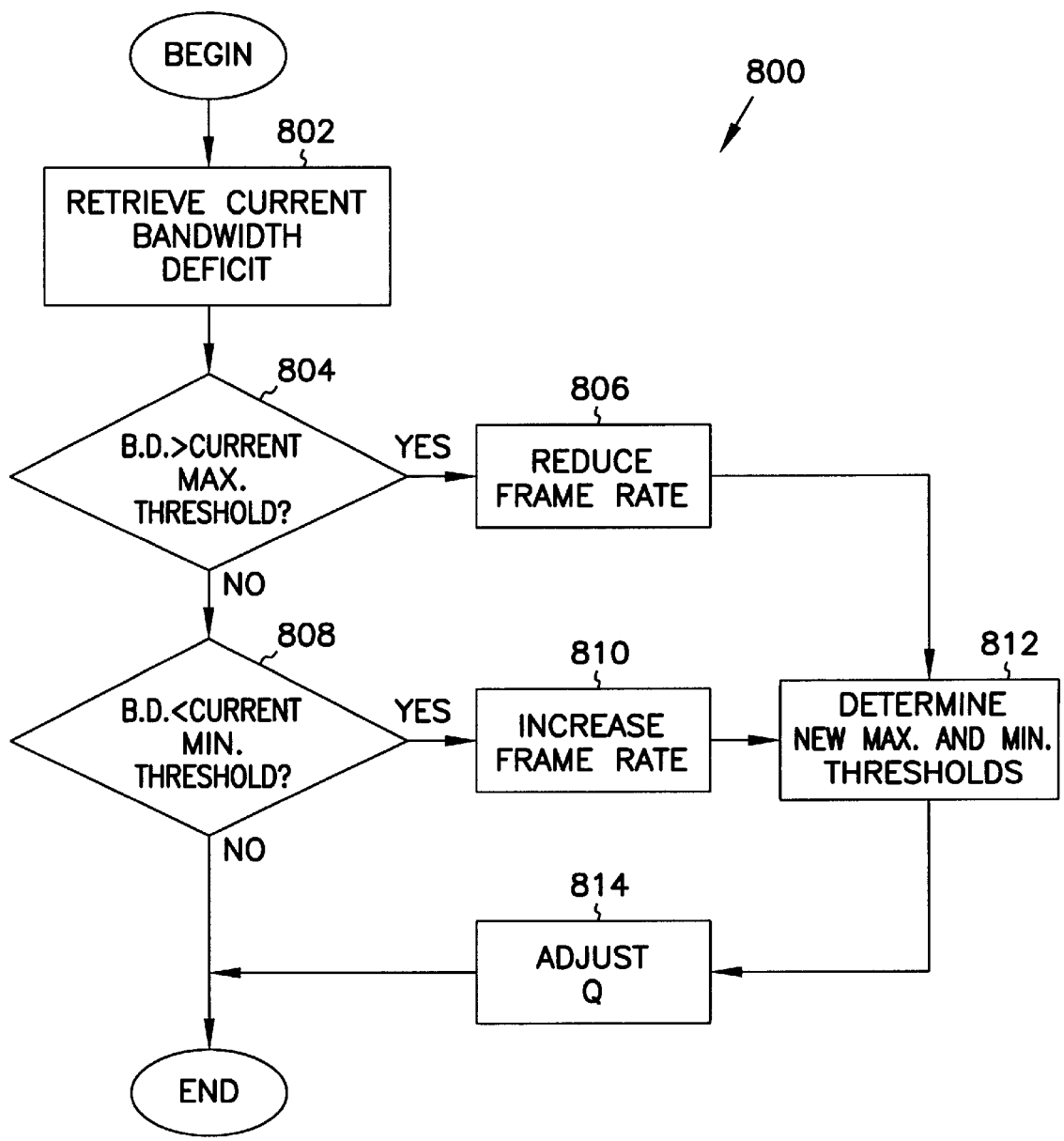
FIG. 8 is a logic flow diagram illustrating the processing of the frame rate controller of FIG. 1.

Frame rate controller 120 controls the frame rate of the encoded video signal according to logic flow diagram 800 (FIG. 8) in which processing begins with step 802. In step 802, frame rate controller 120 (FIG. 1) retrieves from Q adjuster 116 the cumulative bandwidth balance which is described above. As described above, the cumulative bandwidth balance represents a cumulative surplus or deficit of bandwidth resulting from previously encoded frames of the motion video signal. Processing transfers to test step 804 (FIG. 8) in which frame rate controller 120 (FIG. 1) compares the cumulative bandwidth balance to a maximum threshold. As described more completely below, the maximum threshold is periodically adjusted by frame rate controller 120 and depends upon the current frame rate at which video signal encoder 100 is encoding frames. Initially, video signal encoder 100 encodes frames at a rate of 20 frames per second and the maximum threshold is 33% of a maximum allowable bandwidth deficit, e.g., three (3) seconds, and is therefore one (1) second in one embodiment.

If frame rate controller 120 determines that the cumulative bandwidth balance indicates a bandwidth deficit which is greater than the maximum threshold, processing transfer to step 806 (FIG. 8) in which frame rate controller 120 (FIG. 1) reduces the frame rate. In one embodiment, frame rate controller 120 controls video signal encoder 100 to encode at one of a limited number of discrete frame rates by passing less than all frames from source video signal 1540 to frame buffer 102 for encoding through I/P framer 106. For example, frame rate controller 120 passes only every nth frame where represents an integer frame rate. When n equals one (1), frame rate controller 120 passes all frames for encoding.

Conversely, if frame rate controller 120 determines in test step 804 (FIG. 8) that the cumulative bandwidth balance indicates a bandwidth deficit which is not greater than the maximum threshold, processing transfers to test step 808. In test step 808, frame rate controller 120 (FIG. 1) compares the cumulative bandwidth balance to a minimum threshold. If frame rate controller 120 determines that the cumulative bandwidth balance indicates a bandwidth deficit which is less than the minimum threshold, processing transfers to step 810 (FIG. 8) in which frame rate controller 120 (FIG. 1) increases the frame rate. Like the maximum threshold described above, the minimum threshold depends on the currently used frame rate and is adjusted by frame rate controller 120 in the manner described below. Initially, the frame rate currently used by video signal encoder 100 is at a predetermined maximum, e.g., 20 frames per second in one embodiment, and the minimum threshold is negative infinity. Therefore, when the frame rate is at the predetermined maximum, processing never transfers to step 810 (FIG. 8) and the frame rate is never increased. If frame rate controller 120 (FIG. 1) determines that the cumulative bandwidth balance indicates a bandwidth deficit which is not less than the minimum threshold, processing according to logic flow diagram 800 (FIG. 8), and therefore processing of the current frame by frame rate controller 120 (FIG. 1), completes.

After frame rate controller 120 adjusts the current frame rate in either step 806 (FIG. 8) or step 810, processing transfers to step 812 which in frame rate controller 120 (FIG. 1) adjusts new maximum and minimum thresholds for use in subsequent performances of test steps 804 (FIG. 8) and 808. In one embodiment, the various frame rates used by frame rate controller 120 (FIG. 1) and associated maximum and minimum thresholds are as shown in Table A below.

TABLE A

| n | Frame rate (Frames per second) | Max. Threshold | Min. Threshold |
|---|---|---|---|
| 1 | 20 | 33% | −∞ |
| 2 | 10 | 43% | 23% |
| 3 | 5 | 53% | 33% |
| 4 | 2.5 | +∞ | 43% |

In Table A, the various frame rates are expressed in terms of frames per second and the thresholds are expressed in percentages of a maximum allowable deficit beyond which the available bandwidth cannot support all encoded frames. Thus, according to Table A, when a bandwidth deficit of 33%, e.g., one second, of the maximum deficit, frame rate controller 120 reduces the currently used frame rate from 20 frames per second to 10 frames per second. In addition, the maximum and minimum thresholds are adjusted to 43% and 23% of the maximum bandwidth deficit. As a result, frame rate controller 120 does not increase the frame rate back to 20 frames per second until the cumulative bandwidth is reduced to less than 23% of the maximum allowable deficit. The thresholds for each frame rate overlap considerably such that oscillation between frame rates is avoided and reduces jitter in the frame rate. The top row in Table A, in which equals one, represents the initial state of frame rate controller 120.

Processing transfers from step 812 (FIG. 8) to step 814 in which frame rate controller 120 (FIG. 1) adjusts Q 114. Each time the frame rate is increased in step 810 (FIG. 8), frame rate controller 120 (FIG. 1) has detected that bandwidth is being recovered by use of the lower frame rate and Q 114 is increased by approximately 10% in step 814 (FIG. 8) to allow additional bandwidth for the increase in bandwidth used by the higher frame rate. If the frame rate is reduced in step 806 (FIG. 8), Q 114 (FIG. 1) is not adjusted in step 814 (FIG. 8) since the increase in available bandwidth resulting from the reduction in frame rate is needed to recover the bandwidth deficit. In addition, if less than the maximum frame rate is implemented by frame rate controller 120, frame rate controller signals Q adjuster 116 to cause Q adjuster 116 to never lower Q 114 until the implemented frame rate is increased back to its maximum rate. Reductions in frame rate are treated as a last resort to prevent loss of frames or part or all of the transmitted motion video signal due to unavailable bandwidth. Accordingly, reductions in Q 114 to increase video image quality at the, expense of available bandwidth are not permitted when a bandwidth deficit causes a reduction in the implemented frame rate.

Conditional Replenishment

Figure 9:
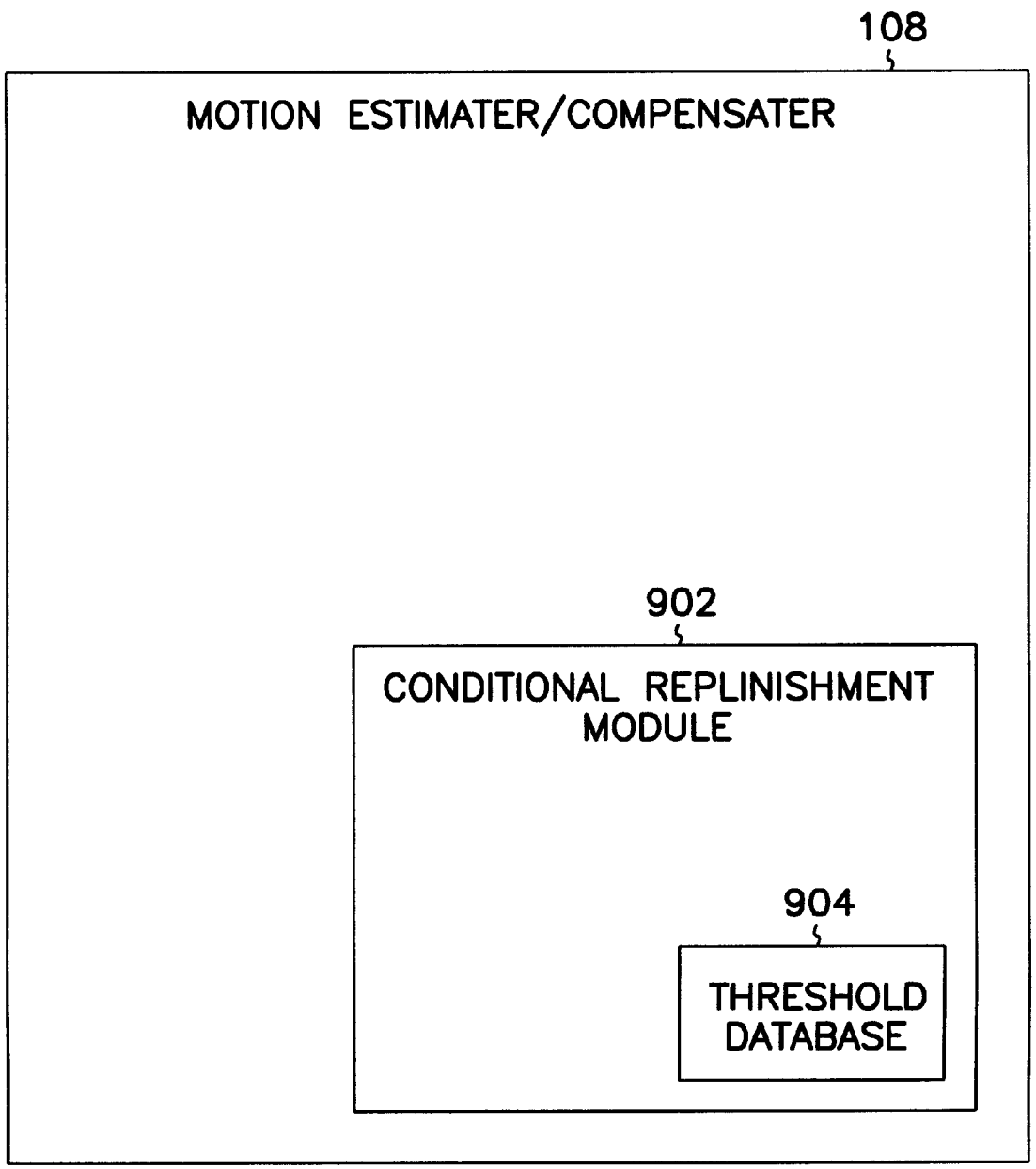
FIG. 9 is a block diagram of the motion estimator/compensator of FIG. 1 which includes a conditional replenishment module.
Figure 10:
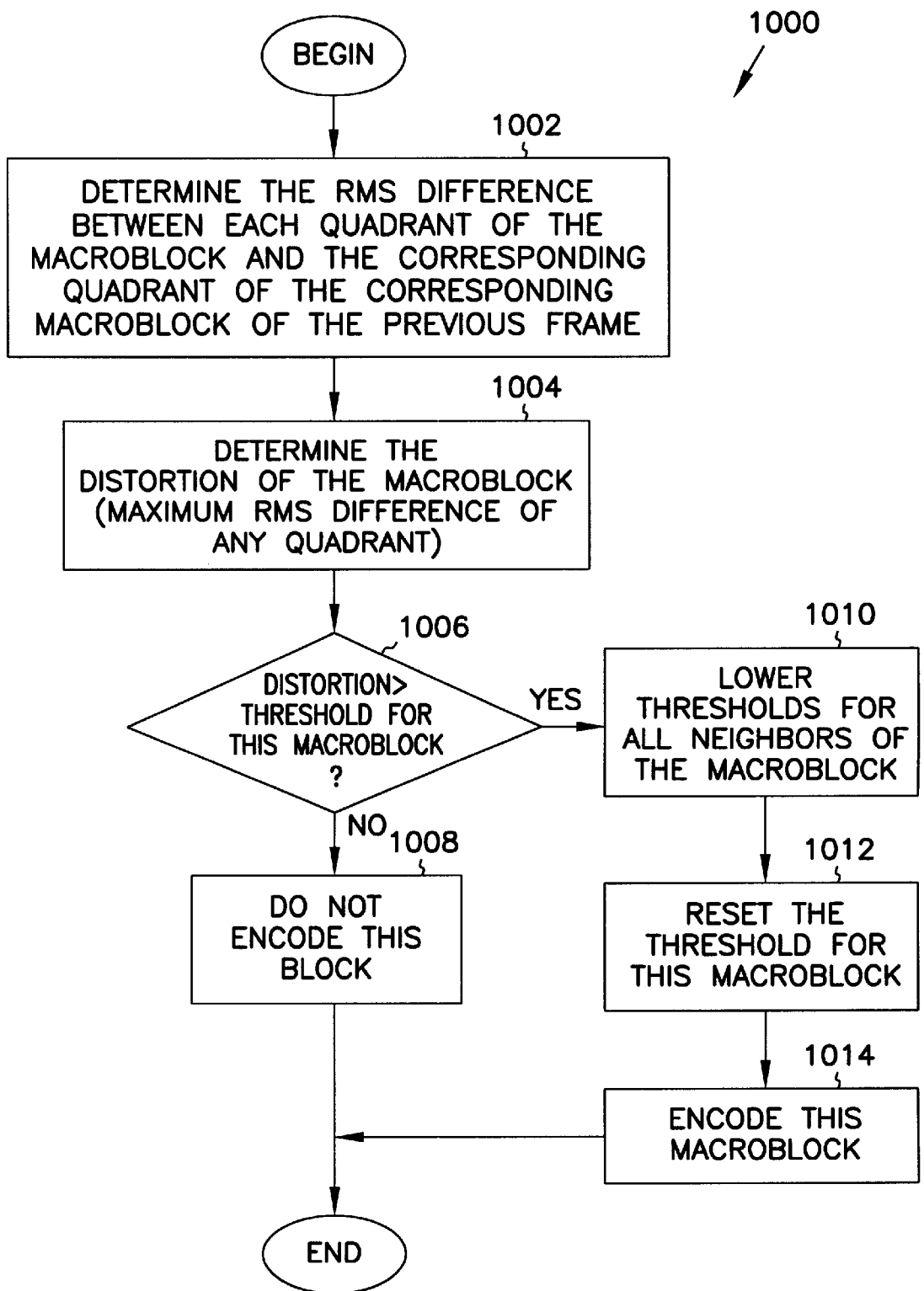
FIG. 10 is a logic flow diagram illustrating the processing of the conditional replenishment module of FIG. 9.

Motion estimator/compensator 108 includes a conditional replenishment module 902 (FIG. 9) which implements conditional replenishment in a manner which simultaneously achieves an appreciable degree, e.g., about 5% in one embodiment, of improved bandwidth conservation and avoids such annoying artifacts as persisting motion image fragments at macroblock borders. In addition, conditional replenishment module 902 preserves processing bandwidth by simplifying encoding and decoding of frames of the motion video signal. Conditional replenishment module 902 processes each macroblock of the current frame to determine whether to encode the macroblock or to set a flag which indicates no change between the macroblock and the corresponding macroblock of the previous frame. The processing of each macroblock of the current frame by conditional replenishment module 902 is illustrated by logic flow diagram 1000 (FIG. 10) in which processing begins in step 1002.

Persistent motion image fragments typically occur along the edges of a macroblock and, in particular, at the corners of the macroblock. Accordingly, differences between the current macroblock and the corresponding previous encoded macroblock are measured in such a way that emphasizes differences at the edges and corners. The corresponding previously encoded macroblock is the corresponding macroblock which was most recently encoded and is stored in a threshold database 904 (FIG. 9) of conditional replenishment module 902. In step 1002 (FIG. 10), conditional replenishment module 902 (FIG. 9) determines the root-mean-square (RMS) difference between each quadrant of the macroblock with the corresponding quadrant of the corresponding previously encoded macroblock. In general, each macroblock represents a 16-pixel by 16-pixel square portion of a frame. The quadrants of the macroblock are four adjacent 8-pixel by 8-pixel square portions of the macroblock. As described briefly above, RMS differences emphasize significant differences in even a few pixels. Therefore, RMS differences are determined rather than absolute pixel differences.

Processing transfers to step 1004 (FIG. 10) in which conditional replenishment module 902 (FIG. 9) determines a measure of distortion for the macroblock. The distortion of the macroblock is the greatest RMS difference of any of the quadrants of the macroblock. By measuring the RMS difference for each quadrant independently, small changes to the corners or edges of the macroblock shows significantly in the measure distortion of the macroblock. Using the RMS difference of the macroblock as a whole would allow three quadrants in which there can be no differences at all to dilute the measured distortion of the macroblock. Thus, the measured distortion of the macroblock is more likely to detect small but perceptible differences in even a very small number of pixels on the corners or edges of the macroblock and simultaneously avoids false detection of such differences even in the presence of significant noise between corresponding macroblocks.

Processing transfers to test step 1006 (FIG. 10) in which conditional replenishment module 902 (FIG. 9) compares the distortion of the macroblock to the distortion threshold for the macroblock. Threshold database 904 includes separate distortion thresholds for each macroblock of a particular frame. Initially, all distortion thresholds are set to a maximum value and are adjusted in the manner described below as each macroblock of each frame is processed by conditional replenishment module 902. In one embodiment, the initial maximum value is the greater of eight (8) or one-half the value of Q 114 (FIG. 1). In test step 1006 (FIG. 10), conditional replenishment module 902 (FIG. 9) retrieves the distortion threshold for the macroblock and compares the retrieved distortion threshold to the measure distortion of the macroblock. If the measured distortion is not greater than the distortion threshold for the macroblock, processing transfers to step 1008 in which conditional replenishment module 902 bypasses encoding of the current macroblock and instead sets a flag which indicates to a decoder of the motion video signal that the current macroblock is substantially identical to the corresponding previous encoded macroblock. After step 1008 (FIG. 10), processing of the current macroblock by conditional replenishment module 902 (FIG. 9) is complete.

Conversely, if conditional replenishment module 902 determines in test step 1006 (FIG. 10) that the measured distortion of the current macroblock is greater than the retrieved distortion threshold for the current macroblock, the current macroblock is determined to be substantively different that the corresponding previous encoded macroblock and processing transfers to step 1010. Substantive change in the current macroblock indicates that substantive change in neighboring macroblocks is more likely. Therefore, in step 1010, conditional replenishment module 902 (FIG. 9) reduces within threshold database 904 the distortion thresholds for all macroblock adjacent to the current macroblock. In one embodiment, each distortion threshold stored in threshold database 904 is reduced no more than once during the processing of any single frame by conditional replenishment module 902.

Processing transfers to step 1012 (FIG. 10) in which conditional replenishment module 902 (FIG. 9) resets the distortion threshold for the current macroblock to the initial maximum value of the distortion threshold since the current macroblock is to be encoded and any artifacts of the current macroblock are overwritten by the newly encoded macroblock. In addition, conditional replenishment module 902 stores the current macroblock within threshold database 904 as the previously encoded macroblock for comparison to subsequently processed corresponding macroblocks. In step 1014 (FIG. 10), the current macroblock is encoded for inclusion in the current frame. After step 1014, processing of the current macroblock by conditional replenishment module 902 (FIG. 9) is complete.

Thus, conditional replenishment module 902 uses a measure of distortion in individual macroblocks which is particularly sensitive to significant changes in even a few pixels of the macroblock, especially at the corners of the macroblock. In addition, conditional replenishment module 902 recognizes that persistent motion video image fragments are more likely when an adjacent macroblock includes substantive change relative to corresponding previously encoded macroblocks and increases sensitivity of distortion detection in those adjacent macroblocks. As a result, conditional replenishment module 902 realizes significant savings in available bandwidth yet avoids appreciable degradation of the quality of the motion video signal as encoded which are attributable to persist motion video image fragments.

Inclusion of Video Signal Encoder in a Computer System

Figure 11:
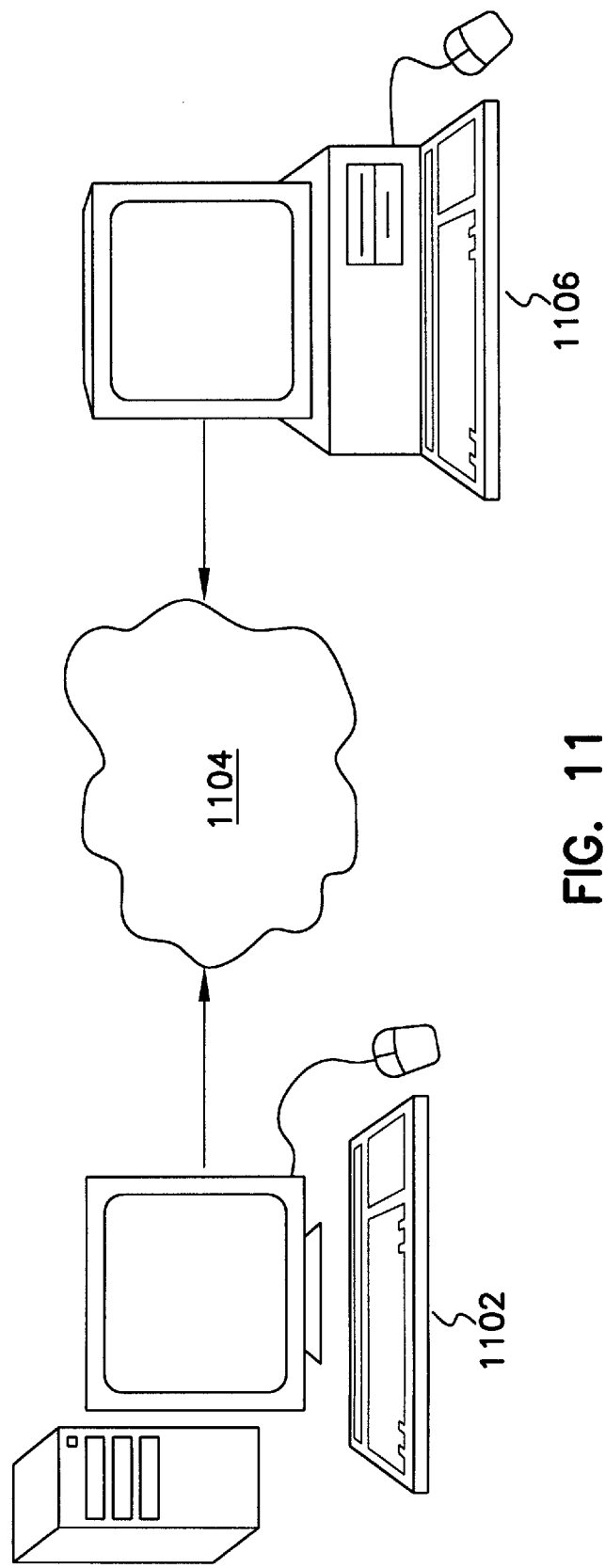
FIG. 11 is a block diagram of a server computer system, which includes the video signal encoder of FIG. 1, and a client computer system which includes a video signal decoder and a computer network which connects the two computers.

In general, video signal encoder 100 (FIG. 1) encodes motion video signals for transmission through a computer network such as computer network 1104 (FIG. 11). Video signal encoder 100 executes within a server computer 1102 as described more completely below and server computer 1102 transmits the encoded motion video signal through computer network 1104 for receipt and real-time decoding of the motion video signal by a client computer 1106. For example, a user of client computer 1106 can direct client computer 1406 to request from server computer 1102 a particular video stream. By decoding and displaying the received motion video stream in real-time, i.e., generally at the same rate as the motion video stream is received and while the motion video stream is being received, client computer 1106 can display the requested motion video stream shortly after requested by the user. Another application requiring real-time decoding and display of received motion video streams is video conferencing.

Figure 12:
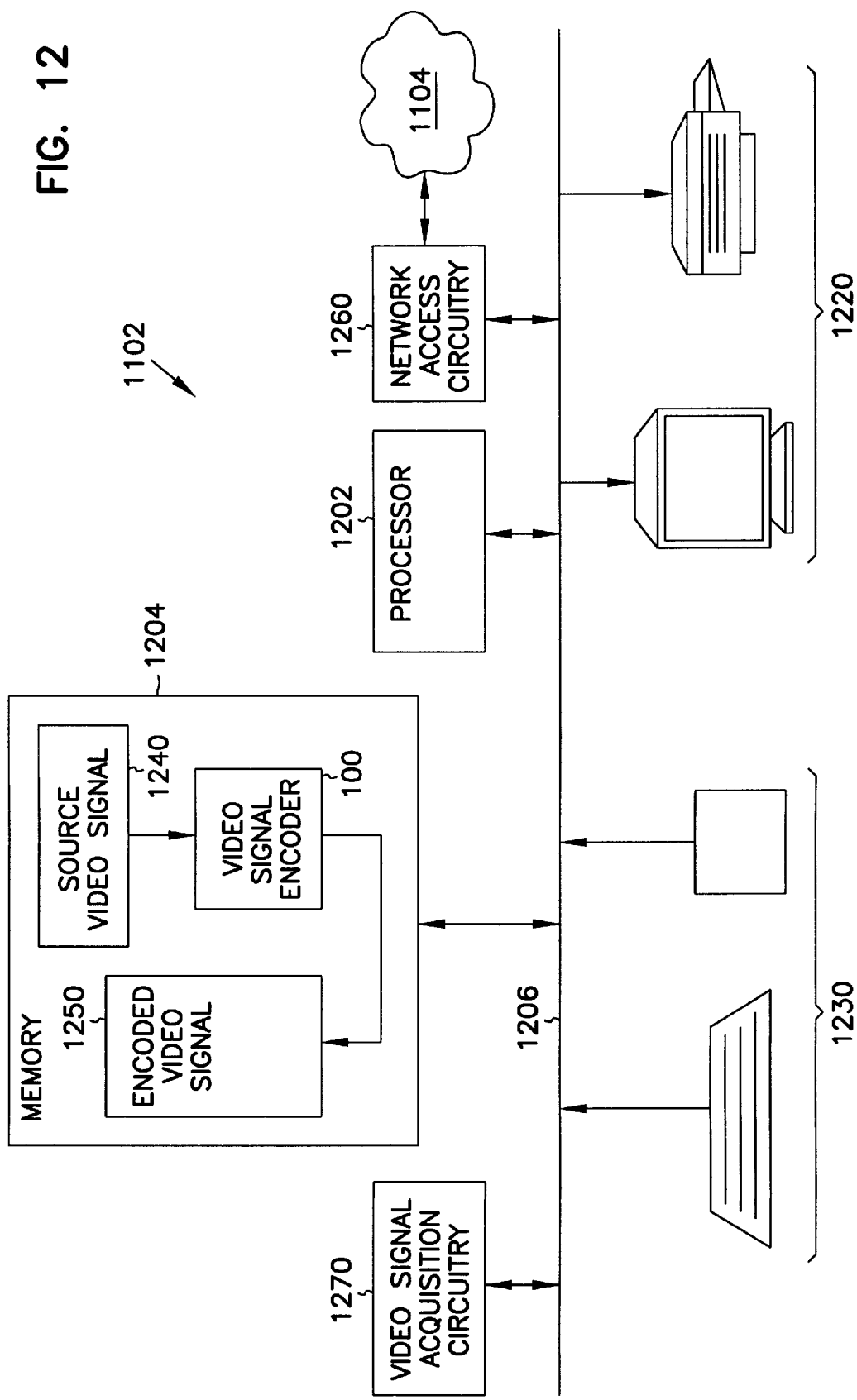
FIG. 12 is a block diagram of the server computer system of FIG. 11.

Server computer 1102 is shown in greater detail in FIG. 12. Server computer 1102 includes a processor 1202 and memory 1204 which is coupled to processor 1202 through an interconnect 1206. Interconnect 1206 can be generally any interconnect mechanism for computer system components and can be, e.g., a bus, a crossbar, a mesh, a torus, or a hypercube. Processor 1202 fetches from memory 1204 computer instructions and executes the fetched computer instructions. In addition, processor 1202 can fetch computer instructions through computer network 1104 through network access circuitry 1260 such as a modem or ethernet network access circuitry. Processor 1202 also reads data from and writes data to memory 1204 and sends data and control signals through interconnect 1206 to one or more computer display devices 1220 and receives data and control signals through interconnect 1206 from one or more computer user input devices 1230 in accordance with fetched and executed computer instructions.

Memory 1204 can include any type of computer memory and can include, without limitation, randomly accessible memory (RAM), read-only memory (ROM), and storage devices which include storage media such as magnetic and/or optical disks. Memory 1204 includes video signal encoder 100 which is all or part of a computer process which in turn executes within processor 1202 from memory 1204. A computer process is generally a collection of computer instructions and data which collectively define a task performed by server computer 1102.

Each of computer display devices 1220 can be any type of computer display device including without limitation a printer, a cathode ray tube (CRT), a light-emitting diode (LED) display, or a liquid crystal display (LCD). Each of computer display devices 1220 receives from processor 1202 control signals and data and, in response to such control signals, displays the received data. Computer display devices 1220, and the control thereof by processor 1202, are conventional.

Each of user input devices 1230 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices generates signals in response to physical manipulation by a user and transmits those signals through interconnect 1206 to processor 1202.

Server computer 1102 also includes video signal acquisition circuitry 1270 which can be, for example, a video camera and video image capture circuitry. Images captured by video image acquisition circuitry 1270 are stored in a buffer in memory 1204 as source video image 1240. Alternatively, motion video images can be captured separately, i.e., by another computer system, and stored in memory 1204 as source video signal 1240 for encoding and delivery to client computer 1106 upon request. In addition, source video signal 1240 can be generated by processing of processor 1202 or by another computer and stored in memory 1204. Computer generated motion video images can be created, for example, by processing 3-dimensional (or 2-dimensional) video models by server computer 1102 according to control signals generated by a user by physical manipulation of one or more of user input devices 1230.

Figure 13:
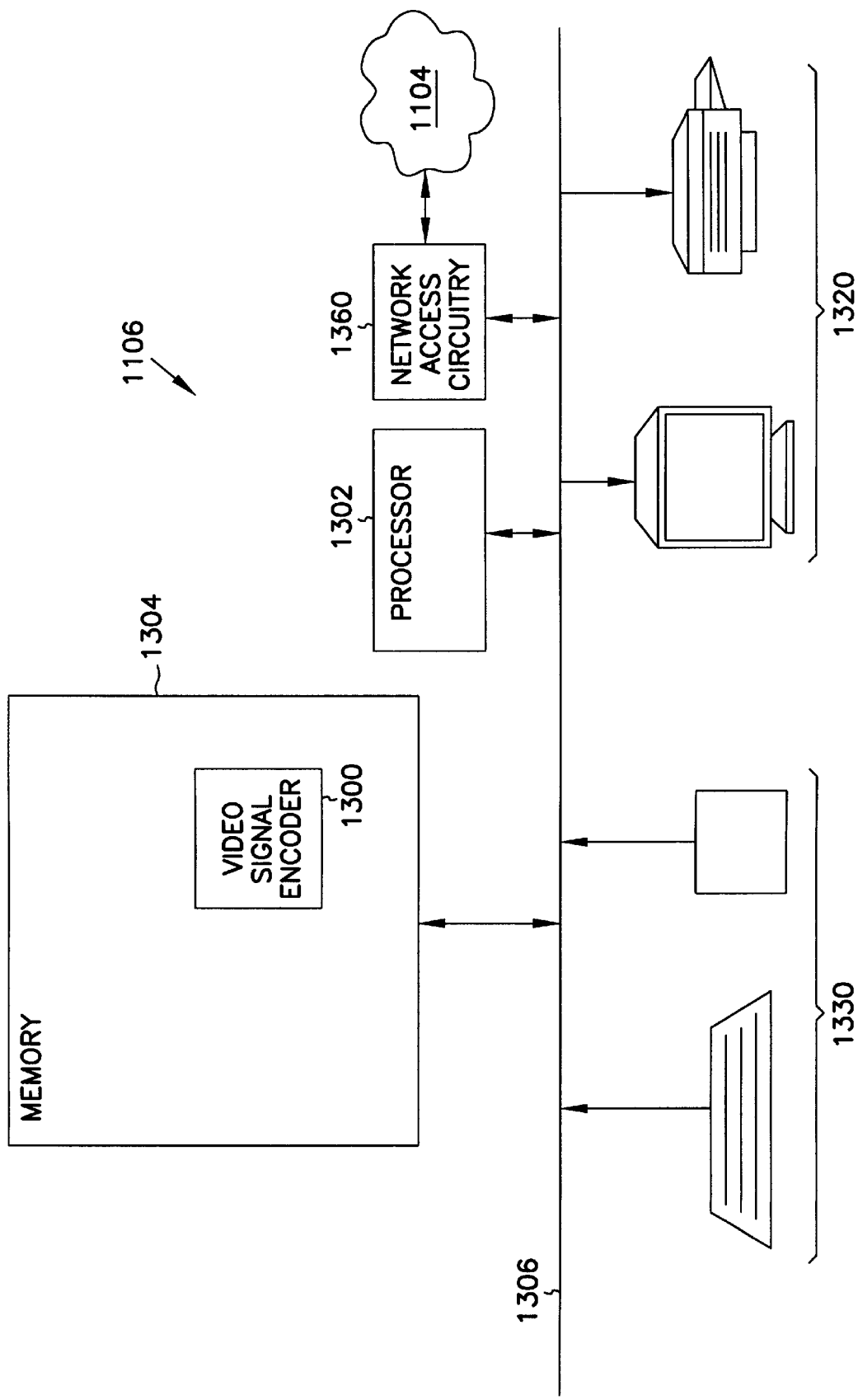
FIG. 13 is a block diagram of the client computer system of FIG. 11.

As described above, video signal encoder 100 executes within processor 1202 from memory 1204. Specifically, processor 1202 fetches computer instructions from video signal encoder 100 and executes those computer instructions. Processor 1202, in executing video signal encoder 100, reads frames from source video signal 1240, processes and encodes those frames in the manner described above, and stores the encoded frames in encoded video signal 1250 or can transmit the encoded frames immediately through computer network 1104 to client computer 1106 (FIG. 11) which is shown in greater detail in FIG. 13.

Client computer 1106 includes a processor 1302, memory 1304, interconnect 1306, computer display devices 1320, user input devices 1330, and network access circuitry 1360, which are analogous to processor 1202 (FIG. 12), memory 1204, interconnect 1206, computer display devices 1220, user input devices 1230, and network access circuitry 1260, respectively, of server computer 1102. Video signal decoder 1300 (FIG. 13) is all or part of a computer process executing within processor 1302 from memory 1304. Video signal decoder 1300 receives encoded motion video signals from server computer 1102 through computer network 1104 and reconstructs frames of a motion video image from the encoded motion video signals, to thereby decode the encoded motion video signals, and displays the reconstructed frames on one or more of computer display devices 1320 for viewing by a user. The decoding and display of the motion video signals is conventional in one embodiment.

The above description is illustrative only and is not limiting. The present invention is limited only by the claims which follow.

What is claimed is:

1. A method for encoding a motion video signal, the method comprising:

determining the elapsed time between a first frame and a previous frame;

determining the total amount of bandwidth available for the first frame;

determining a desired size for the first frame of the motion video signal, the desired size being a function of the elapsed time and the total amount of bandwidth available;

encoding the first frame of the motion video signal to form an encoded frame;

determining an encoded size of the encoded frame;

comparing the encoded size to the desired size;

adjusting a quantization parameter such that encoding the first frame according to the quantization parameter as adjusted would form a different encoded frame having a size closer to the desired size than the encoded size is to the desired size; and exclusively encoding a second frame of the motion video signal according to the quantization parameter as adjusted.

2. The method of claim 1 wherein the second frame is subsequent to the first frame in the motion video signal.

3. The method of claim 1 wherein the step of adjusting comprises:

determining a difference between the encoded size and the desired size; and adjusting the quantization parameter by an amount which is proportional to the difference.

4. A computer readable medium useful in association with a computer which includes a processor and a memory, the computer readable medium including computer instructions which are configured to cause the computer to perform the steps of:

determining the elapsed time between a first frame and a previous frame;

determining the total amount of bandwidth available for the first frame;

determining a desired size for a first frame of a motion video signal, the desired size being a function of the elapsed time and the total amount of bandwidth available;

encoding the first frame of the motion video signal to form an encoded frame;

determining an encoded size of the encoded frame;

comparing the encoded size to the desired size;

adjusting a quantization parameter such that encoding the first frame according to the quantization parameter as adjusted would form a different encoded frame having a size closer to the desired size than the encoded size is to the desired size; and exclusively encoding a second frame of the motion video signal according to the quantization parameter as adjusted.

5. The computer readable medium of claim 4 wherein the second frame is subsequent to the first frame in the motion video signal.

6. The computer readable medium of claim 4 wherein the step of adjusting comprises:

determining a difference between the encoded size and the desired size; and adjusting the quantization parameter by an amount which is proportional to the difference.

7. A computer system comprising:

a processor;

a memory operatively coupled to the processor; and a motion video signal encoder which executes in the processor from the memory and which, when executed by the processor, performs the steps of:

determining the elapsed time between a first frame and a previous frame;

determining the total amount of bandwidth available for the first frame;

determining a desired size for a first frame of the motion video signal, the desired size being a function of the elapsed time and the total amount of bandwidth available;

encoding the first frame of the motion video signal to form an encoded frame;

determining an encoded size of the encoded frame;

comparing the encoded size to the desired size;

adjusting a quantization parameter such that encoding the first frame according to the quantization parameter as adjusted would form a different encoded frame having a size closer to the desired size than the encoded size is to the desired size; and exclusively encoding a second frame of the motion video signal according to the quantization parameter as adjusted.

8. The computer system of claim 7 wherein the second frame is subsequent to the first frame in the motion video signal.

9. The computer system of claim 7 wherein the step of adjusting comprises:

determining a difference between the encoded size and the desired size; and adjusting the quantization parameter by an amount which is proportional to the difference.

* * * * *

UNITED STATES PATENT AND TRADEMARK OFFICE
CERTIFICATE OF CORRECTION

PATENT NO.    : 6,118,817
DATED         : September 12, 2000
INVENTOR(S)   : Albert S. Wang It is certified that error appears in the above-identified patent and that said Letters Patent is hereby corrected as shown below:

Title page,
Item [56] References Cited - U.S. PATENT DOCUMENTS, the following patents were omitted:

| | | | |
|---|---|---|---|
| 5,699,484 | 12/1997 | Davis | 345/2.2 |
| 5,784,115 | 7/1998 | Bozdagi | 348/452 |
| 5,892,535 | 4/1999 | Allen et al. | 348/9 |

Signed and Sealed this

Twenty-third Day of October, 2001

Attest:

NICHOLAS P. GODICI
Attesting Officer    Acting Director of the United States Patent and Trademark Office